United States Patent [19]
Kodimer et al.

[11] Patent Number: 6,003,078
[45] Date of Patent: Dec. 14, 1999

[54] AUTOMATIC SERVICE REQUESTS OVER THE WORLD WIDE WEB

[75] Inventors: Marianne L. Kodimer, Anaheim; Joohae Kim, Irvine; Dan Danknick, Orange; Rakesh Mahajan, Laguna Hills, all of Calif.

[73] Assignee: Canon Information Systems, Inc., Irvine, Calif.

[21] Appl. No.: 08/749,638

[22] Filed: Nov. 15, 1996

[51] Int. Cl.⁶ .................................................. G06F 17/00
[52] U.S. Cl. .......................................................... 709/224
[58] Field of Search ......................... 395/200.48, 200.54; 399/8, 11, 12; 340/825.34; 709/224

[56] References Cited

U.S. PATENT DOCUMENTS

| | | | |
|---|---|---|---|
| 5,414,494 | 5/1995 | Aikens et al. | 355/206 |
| 5,459,552 | 10/1995 | Ohira | 355/202 |
| 5,603,060 | 2/1997 | Weinberger et al. | 395/200.48 |
| 5,708,780 | 1/1998 | Levergood et al. | 395/200.48 |
| 5,737,739 | 4/1998 | Shirley et al. | 399/8 |
| 5,742,762 | 4/1998 | Scholl et al. | 395/200.53 |
| 5,760,916 | 6/1998 | Dellert et al. | 399/8 |
| 5,760,917 | 6/1998 | Sheridan | 399/11 |

FOREIGN PATENT DOCUMENTS

| | | |
|---|---|---|
| 599523 | 6/1994 | European Pat. Off. . |
| 715221 | 6/1996 | European Pat. Off. . |
| 2301980 | 12/1996 | United Kingdom . |

OTHER PUBLICATIONS

Hanson et al., "Introductory Material", HDE, Inc., 1996, pp. 1996. 1–10.
"HDE Announces Web Printer Driver and Server Software availability", HDE, Inc., Oct. 1996 (3 pages).
HP Web JetAdmin, Hewlett–Packard, Nov. 1996 (2 pages).
"HP and Tek Tackle the Potential and Pitfalls of the Web", Excerpt from The Hard Copy Observer, Jan. 1996 (3 pages).
"MarkVision Printer Management For Intranets", Lexmark, undated (2 pages).
"PDP, Colorbus, and HDE Tackle Printing On The Web", Excert from The Hard Copy Observer, Mar. 1996 (2 pages).
"Lexmark: Web–based MarkVision Tech Announcement", Lexmark MarkVision News, undated.
"HP Unveils Strategy for Future of Printer", HP Press Release, Nov. 4, 1996 (3 pages).
"HP Forms Internet Solution Operation", Hewlett–Packard Printing & Imaging News, Jul 15, 1996 (5 pages).
"Tektronix PhaserLink Software: Web–Powered Print Administration and Support", Tektronix, Inc., Jan. 8, 1996 (1 page).
"PhaserLink Software: Easy access to your printer's information", Tektronix, Inc., Jan. 8, 1996 (23 pages).
"Tektronix Continues Strong Leadership in the Color Laser–Class Printer Market", Textronix, Inc. Leadership Press Release, May 21, 1996 (3 pages).
"PhaserLink Software", Tektronix, Inc., undated (6 pages), (No date).
"PhaserLink Software: Your Printer's Information Link", Tektronix, Inc., undated (3 pages), (no date).
"PhaserLink Software", Tektronix, Inc. PhaserLink Software Home Page, undated (2 pages), (no date).
"PhaserLink Demo", Demonstration of Tektronix, Inc. PhaserLink ™ Printer Software, undated (27 pages), (no date).

(List continued on next page.)

*Primary Examiner*—Ellis B. Ramirez
*Attorney, Agent, or Firm*—Fitzpatrick, Cella, Harper & Scinto

[57] ABSTRACT

Status information concerning a condition of a network peripheral device connected to a network is automatically communicated to a remote service organization. First, a condition of the network peripheral device is detected. Then, in response to the detected condition, status information is automatically obtained, the status information corresponding to the detected condition. Finally, upon obtaining the status information, a packet is automatically transmitted to the remote service organization via the network, the packet containing the status information.

39 Claims, 21 Drawing Sheets

OTHER PUBLICATIONS

"Xerox Sets Direction For Internet Web–based Printing", PR Newswire, Jun. 18, 1996, p. 0618NYTU024 (from Dialog search).

"JetAdmin to let user manage HP's printers over the Web", InfoWorld, Jul. 15, 1996, p. 12 (from Dialog search).

IBM introduces family of open workgroup workgroup printers; aggressively expands printer line with four inexpensive, feature–rich network printers, Business Wire, Jun. 18, 1996, p. 06181220 (from Dialog search).

"Textronix' PhaserLink Software Leverages Runaway Popularity of WWW", PR NewswIre, Jan. 8, 1996, p. 0108LAM012 (from Dialog search).

"NDPS cures today's printing woes, but lacks longevity", PC Week, Jul. 15, 1996, p. N03 (from Dialog search).

"Pacific Data Products Unveils DirectNet Web Software . . .", Business Wire, Jan. 22, 1996, p. 01220030 (from Dialog search).

Berinato, Scott, "Network printing continues migration to the Internet", PC Week, Oct. 21, 1996.

```
<HTML>                        ┌─130
<HEAD>
<TITLE>Canon Webspot v1.0 pre-alpha</TITLE>

<FRAMESET ROWS="90%,*">

<FRAMESET COLS="144, *">                    ┌─131
        <FRAME SRC="left.htm" NAME="TabFrame">
        <FRAME SRC="home.html" NAME="MainFrame">┌─132
    </FRAMESET>
    <FRAME NAME="FooterFrame"
SRC="http://146.184.22.107/help/footer.htm"─┌─134
MARGINHEIGHT="1"   BORDER=0>
</FRAMESET>

<BR>

<META NAME="GENERATOR" CONTENT="Internet Assistant for
Microsoft Word 2.0z">
</HEAD>
<BODY TOPMARGIN=0 BACKGROUND="FOOT_BACK.GIF">
<P>
<BR>

</BODY>
</HTML>
```

FIG. 8

```
                                                    ┌─140
<!DOCTYPE HTML PUBLIC "-//W3C//DTD HTML 3.2//EN">
<HTML>
<HEAD>
    <TITLE>Untitled</TITLE>
    <META NAME="GENERATOR" CONTENT="Mozilla/3.0Gold (Win95; I)
[Netscape]">
</HEAD>
<BODY>

<P><A> HREF="home.htm" TARGET="MainFrame"><IMG SRC="GRBUL.GIF"
BORDER=0 HEIGHT=12 WIDTH=11></A><B><FONT
COLOR="#000000">Welcome</FONT></B>

<HR></P>

<P><mk></P>
           ┌─141
<P><A HREF="status2.htm" TARGET="MainFrame"><IMG
SRC="GRBUL.GIF" BORDER=0 HEIGHT=12 WIDTH=11></A><B><FONT
COLOR="#000080">Status&
Errors</FONT></B>
<HR></P>
           ┌─141
<P><A HREF="features.htm" TARGET="MainFrame"><IMG
SRC="GRBUL.GIF" BORDER=0 HEIGHT=12 WIDTH=11></A><B><FONT
COLOR="#800080">Features</FONT></B>

<HR></P>
          ┌─141
<P><A HREF="admin.htm" TARGET="MainFrame"><IMG
SRC="GRBUL.GIF" BORDER=0 HEIGHT=12 WIDTH=11></A><B><FONT
COLOR="#008080">Administration</FONT></B>

<HR></P>
          ┌─142
<APPLET CODE="select.class">
</APPLET>

</BODY>
<HTML>
```

FIG. 9

```
                                                                    /-160
<!DOCTYPE HTML PUBLIC "-//W3C//DTD HTML 3.2//EN">
<HTML>
<HEAD>
    <TITLE>Untitled</TITLE>
    <META NAME="GENERATOR" CONTENT="Mozilla/3.0Gold (Win95; I)
[Netscape]">
</HEAD>
<BODY>

<P><A NAME="admin_currentconfig"></A><FONT SIZE=+2><B><FONT
COLOR="#008080">Administration</FONT></B>
</FONT><IMG
SRC="file:///G|/USERS/MKODIMER/MKODIMER/webspot/proto/reboot_
1.gif" HEIGHT=18 WIDTH=94><A HREF="flash.f1"><IMG
SRC="file:///G|/USERS/MKODIMER/MKODIMER/webspot/proto/flash_1
.gif" BORDER=0 HEIGHT=18 WIDTH=178></A><A
HREF="p_defaults.pd"><IMG
SRC="file:///G|/USERS/MKODIMER/MKODIMER/webspot/proto/printse
ttings_1.gif" BORDER=0 HEIGHT=18 WIDTH=174></A></P>
161
  \<APPLET CODE="appicons.class" WIDTH=100 HEIGHT=25>
    </APPLET>
165
  \<APPLET CODE="buildtbl.class" WIDTH=600 HEIGHT=1000>
    </APPLET>

</BODY>
</HTML>
```

FIG. 11

AUTOMATIC SERVICE REQUESTS OVER THE WORLD WIDE WEB

BACKGROUND OF THE INVENTION

1. Field of the Invention

The present invention concerns techniques by which a network peripheral device may send an automatic service request over the world wide web or other network and means for implementing such techniques.

2. Description of the Related Art

Traditionally, when a peripheral device such as a network copier required manufacturer's servicing, the user was required to first notice the condition necessitating service, such as inoperability or an error message displayed by the peripheral device, by physically inspecting the device. Then, the user had to notify the manufacturer's technical support or servicing department, for example by placing a telephone call or faxing a service request form. This latter step often involved locating and providing various types of information to the manufacturer's technical support department, and presented a significant potential for error in communicating the information accurately.

One method has been proposed by which a peripheral device requiring service would initiate a modem connection to the service organization and then would communicate servicing request information via the modem connection. However, such a method has several drawbacks. First, in order for the recipient to effectively use data transmitted via a modem connection, it is generally necessary for the recipient to have software which is specifically compatible with the sender's in order to decode the transmitted data. Second, using the modem connection technique generally only allows a service organization, such as technical support, to receive service requests over periods during which it maintains a server connected to a modem at a preestablished telephone number.

SUMMARY OF THE INVENTION

It is therefore an object of the present invention to address the foregoing difficulties by providing methods and apparatuses by which a network peripheral device requiring service can send an automatic service request over a network. As used herein, a "network peripheral device" means a peripheral device together with a network board for communicating over a network. The service request can be a request for technical maintenance and service or might be a request, for example, to a sales organization ordering a part. Additionally, the service request might be triggered completely internally to the peripheral device making the request or might be triggered based on some external input or instruction.

Thus, the present invention simultaneously automates the service request procedure, unlike modem connection methods, the present invention permits the service organization to receive data while connected to the internet, regardless of where its server is located geographically. As a result, the present invention permits the service organization to implement flexible methods of business operation which presently might not be easily obtainable with a modem connection method.

The invention communicates status information to a remote service organization from a network peripheral device connected to a network router. First, a condition of the network peripheral device is detected. Then, in response to the detected condition, status information is automatically obtained, the status information corresponding to the detected condition. Finally, upon obtaining the status information, a packet is automatically transmitted to the remote service organization via the network, the packet containing the status information.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 8 is an HTML file corresponding to the copier home page of FIG. 7.

FIG. 9 is an HTML file corresponding to a Tab Frame of the copier home page of FIG. 7.

FIG. 11 is an HTML file corresponding to the "Administration" web page of FIG. 10.

DETAILED DESCRIPTION OF THE PREFERRED EMBODIMENTS

[Network Architecture]

Figure 1:
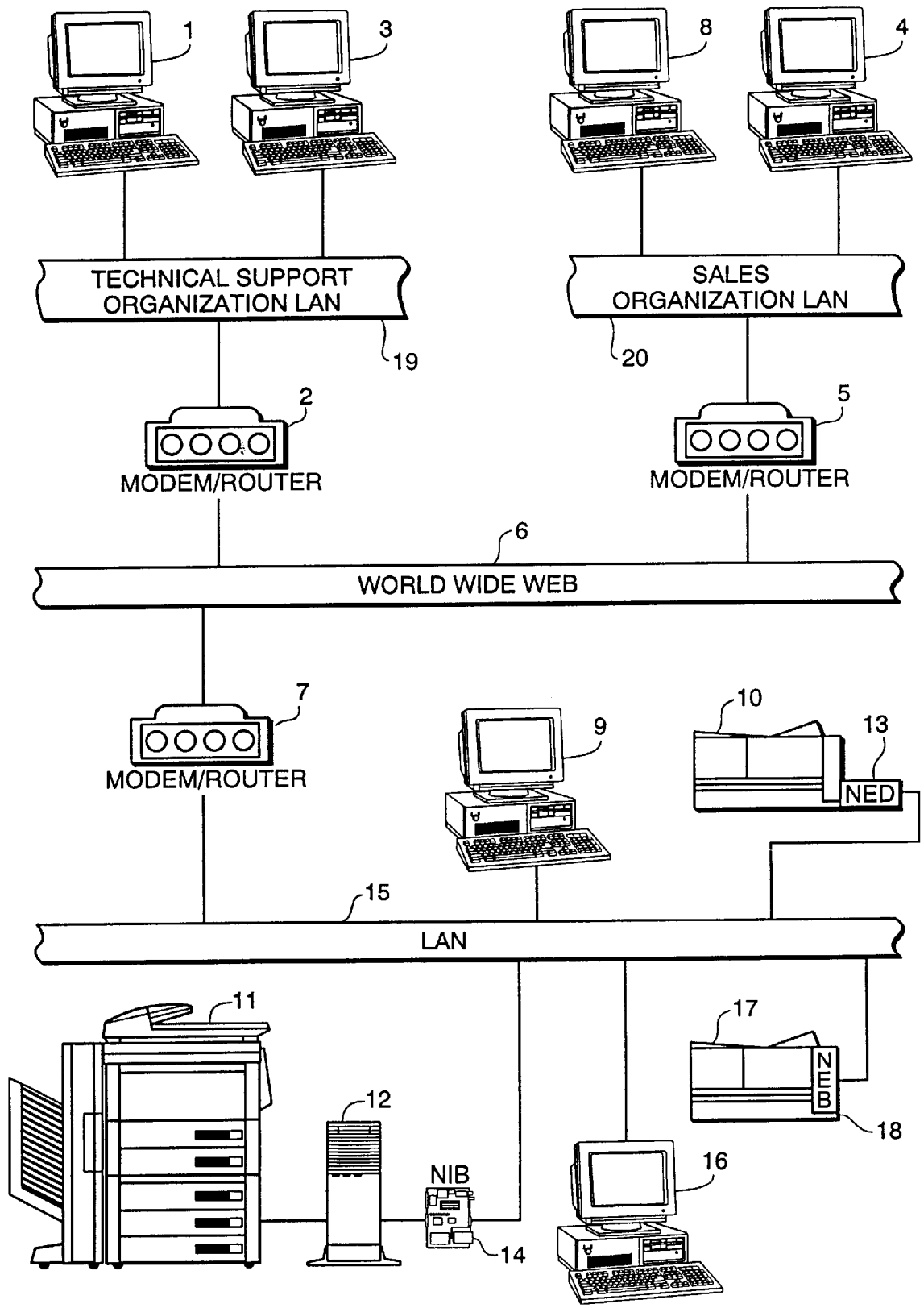
FIG. 1 is a diagram of a network architecture which can be used to implement the present invention.

FIG. 1 is a diagram of a network architecture which can be used to implement the present invention. Included in FIG.

1 is Network Interface Board (NIB) 14, an example of which is described in U.S. patent application Ser. No. 08/409,034, filed Mar. 23, 1995, entitled "Network Interface Board For Digital Copier". The NIB 14 is coupled to a copier 11 having an open architecture through a Multi-Device Controller (MDC) 12. In a preferred embodiment, the copier 11 is a Canon GP-55 or other copier capable of establishing a robust interface with NIB 14. The NIB 14 is also coupled to a local area network (LAN) 15 through a LAN interface, for example, an Ethernet interface 10Base-2 with a Coax connector or 10Base-T with an RJ-45 connector. Alternatively, the present invention may utilize a LAN conforming to a Token-ring architecture.

Plural workstations, such as workstations 9 and 16, are also connected to the LAN 15, and under control of the network operating system these workstations are able to communicate with the NIB 14. One of the workstations, such as workstation 9, may be designated for use as the network administrator.

In addition, workstations 9 and 16 may each comprise a standard workstation capable of generating data files, transmitting them onto the LAN 15, receiving files from the LAN 15, and displaying and/or processing such files. A workstation may also have a printer connected directly to it.

Printers 10 and 17 are connected to the LAN 15 respectively through a Network Expansion Device (NED) 13 and a Network Expansion Board (NEB) 18 (examples of which are described in co-pending U.S. patent application Ser. No. 08/489,116, filed Jun. 9, 1995, entitled "Outputting a Network Device Log File"), respectively. Other unshown peripherals may also be connected to the LAN 15.

Typically, a LAN services a fairly localized group of users such as a group of users on one floor or contiguous floors in a building. As users become more remote from one another, for example, in different buildings or different states, a wide area network (WAN) (not shown) may be created which is essentially a collection of several LANs all connected by high speed digital lines, such as high speed integrated services digital network (ISDN) telephone lines.

FIG. 1 shows that LAN 15 is connected to the World Wide Web 6 via a router 7. Accordingly, LAN 15 must support data packets transmitted according to the TCP/IP network protocol (IP-packets). Each IP-packet includes a destination field indicating the network address of the intended recipient, a source field indicating the network address of the sender, a data field, a field indicating the length of the data field, and a checksum field for error detection. Although the invention is described with respect to IP communications, it should be understood that the invention can be implemented using other communication protocols as well.

The router 7 primarily provides the LAN 15 with Web monitoring functions, routing IP-packets intended for devices on LAN 15 to the LAN 15 and discarding all others, and placing IP-packets generated by devices on LAN 15 onto the Web 6.

Also connected to the Web 6 are router 2 which provides workstations 1 and 3 with access to the Web 6 and router 5 which provides workstations 4 and 8 with access to the Web 6. In the present invention, workstations 1 and 3 are connected to a Technical Support organization LAN 19 and workstations 4 and 8 are connected to a Sales organization LAN 20. Similarly, the workstation 4 is located at the Sales center responsible for providing accessories to the GP-55 copier 11.

A preferred embodiment of the present invention is described below in the context of IP communications among workstations 1 and 9, each of which includes a network expansion board (not shown) for generating IP-packets, and copier 11 which utilizes NIB 14 to generate IP-packets. However, the present invention is not limited to using the foregoing hardware. For example, the invention could also be implemented by using a network expansion device, such as NED 13, a network expansion board, such as NEB 18, provided a robust peripheral to network board interface can be established. Similarly, other peripheral devices could be substituted for copier 11, and a variety of processing devices could be substituted for workstations 1 and 9.

[Network Interface Board]

Broadly speaking, the NIB 14 is an interactive network device which couples the copier 11 to the LAN 15, making the copier 11 a responsive and interactive network member. The NIB 14 receives copy data, status requests, and control commands from the LAN 15, transmits copy data, status requests, and control commands to the copier 11 for execution, and transmits status information back to the LAN 15. Thus, the NIB 14 can perform not only remote copying services and copy server functionalities, but can also offer to network members whatever status and control features are available from the peripheral interface.

Figure 2:
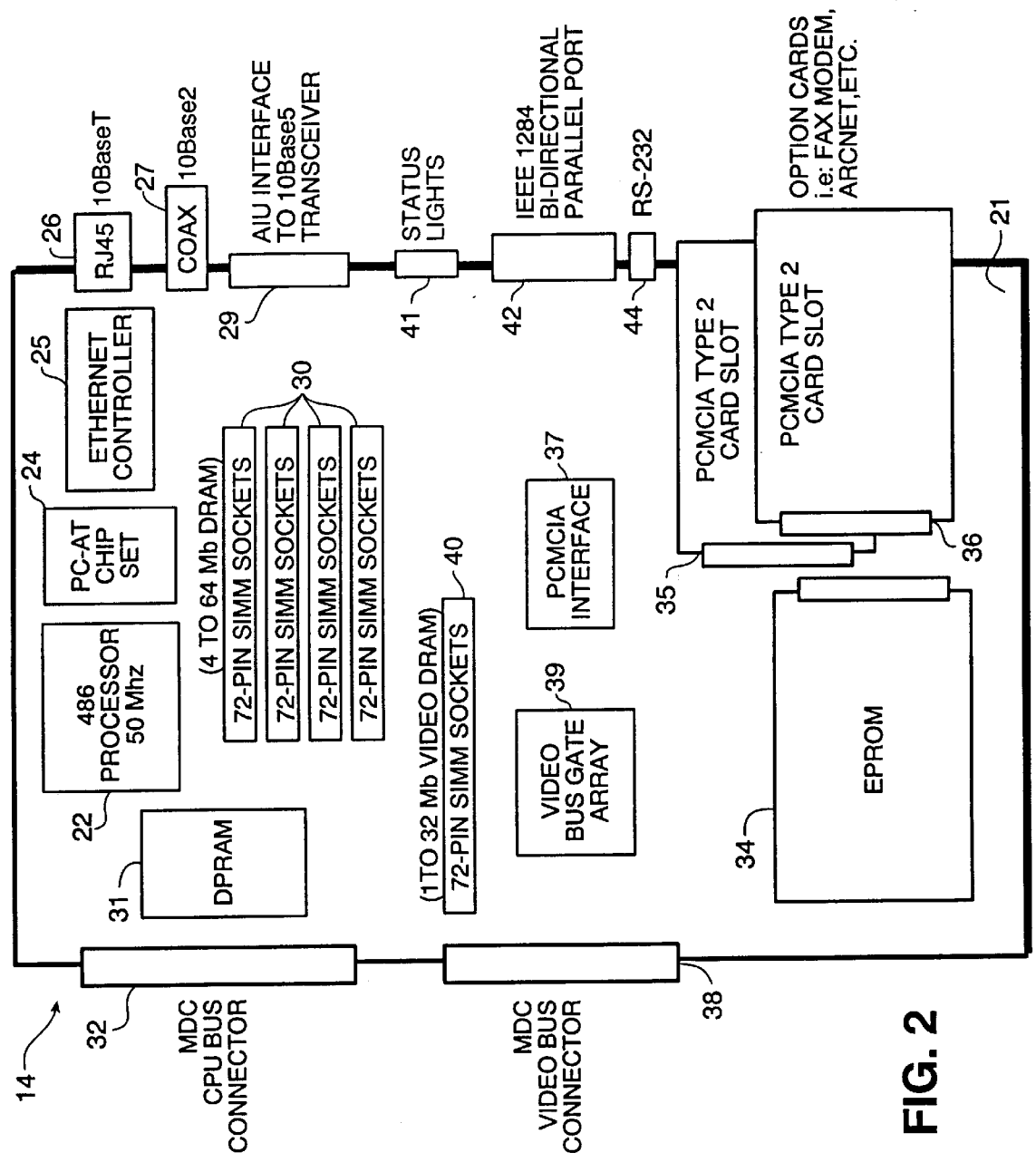
FIG. 2 is a diagram showing the physical layout of components on a network board which can be used in the present invention.

FIG. 2 is a view showing the physical layout of components on the network interface board 14. As shown in FIG. 2, the NIB 14 includes, all mounted on a PCB (printed circuit board) 21, ac microprocessor 22 such as an Intel 80486-DX2 microprocessor for controlling all functions on the NIB 14, a PC-AT chipset 24 which includes logic circuitry specific to the NIB 14 for controlling and monitoring various functions on the NIB 14, such as monitoring address and data buses and issuing chip select commands, a network controller 25 such as an Ethernet controller for managing access to the local area network, and three network connectors 26, 27 and 29 for connecting to any of the standard network wiring such as T-base 10, T-base 10 and AUI. The microprocessor 22 is provided with a minimum of 4 MB of dynamic RAM (DRAM) via the SIMM sockets 30, which can accept up to 64 MB of DRAM. A dual port RAM 31 is provided to communicate with the MDC 12 via a connector 32.

The microprocessor 22 is also provided with access to EPROM 34 for persistent storage. Two option slots 35 and 36 respectively, which are controlled by a PCMCIA interface controller 37 are provided for PCMCIA type 2 expansions by which it is possible to equip the NIB 14 with a variety of additional peripherals such as a modem, an ArcNet interface, and the like.

Access to the MDC's video bus is provided via a video bus connector 38 which is controlled by a video interface gate array 39. Gate array 39 has access to a minimum of 1 MB of video RAM (VRAM) which is expandable up to 32 MB of DRAM via a SIMM socket 40.

Status lights 41 are provided for a user to monitor internal status flags of the NIB 14. In addition, two data interface ports are provided: a bi-directional parallel port 42 so as to permit connection to a bi-directional data device such as a stand-alone computer, and an RS-232 serial port 44 so as to support serial communication such as for debug purposes.

[Network Interface Board Software]

Figure 3:
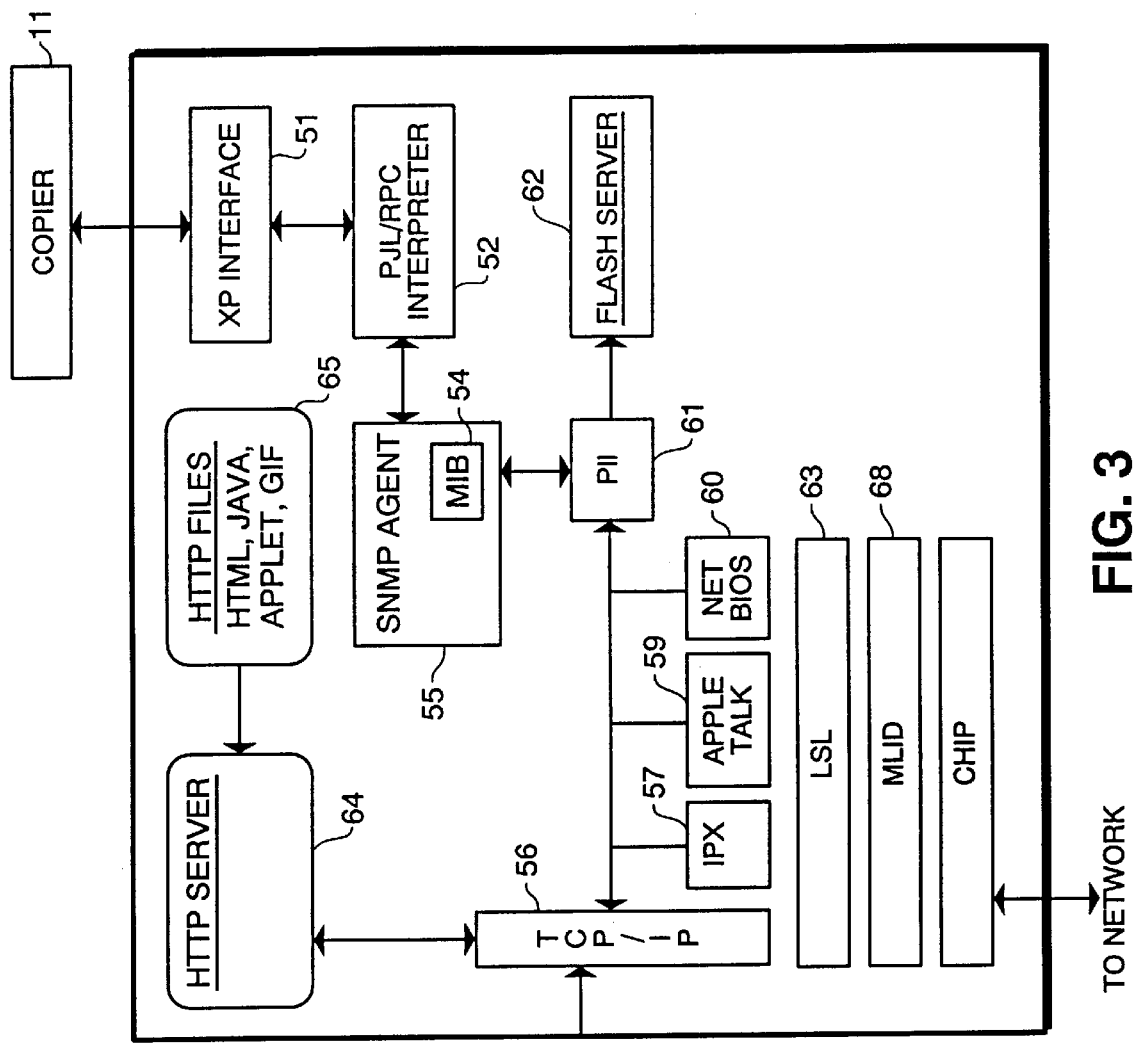
FIG. 3 is a functional block diagram of the network board.

FIG. 3 illustrates examples of blocks of code, or software modules, that are utilized by the NIB 14. The XP module 51 provides a standardized interface between the copier 11 and the NIB 14. A MLID (Multi Link Interface Driver) 68 is a piece of code (Media Support Module, or MSM) linked together with a piece of customized code (Hardware Support Module, or HSM) that is the lowest level of connection to the LAN 15. The LSL (Link Support Layer) 63 is a piece of code that acts as a multiplexer between the low level MLID 68 and the TCP/IP protocol stack 56, the Novell IPX protocol stack 57, the Appletalk protocol stack 59 and the NetBIOS protocol stack 60 above it.

The Protocol Independent Interface (PII) module 61 provides a single interface for communication via the various supported protocols. Because the NIB 14 supports multiple protocol stacks, this module exists as long as the NIB 14 is running. Flash server 62 is used to reprogram EPROM 34. PII module 61 works in conjunction with flash server 62 to monitor and support the various protocol stacks.

The NIB 14 also supports a Hyper Text Transfer Protocol ("HTTP") server 64 which enables workstations 9 and 16 of the LAN 15 to access the NIB using a web browser which supports World Wide Web protocol. Accordingly, the NIB 14 also contains files which may be passed to such a web browser according to HTTP protocol, such as Hyper Text Markup Language ("HTML") files, JAVA applets, or Graphics Interchange Format ("GIF") files. JAVA applets are platform-independent segments of executable code which are designed to run behind an applet-enabled web browser on a workstation using a JAVA Virtual Machine ("JVM").

In addition, the NIB 14 provides the copier 11 with a Simple Network Management Protocol ("SNMP") agent 55. SNMP agents are widely used to exchange monitoring and control data between network peripherals and network workstations. The agent 55 returns information contained in a Management Information Base 54, which is a data structure that defines what information can be obtained from the copier 11 and what aspects of the copier 11 can be controlled. The NIB 14 includes an PJL/RPC interpreter 52 to interface between the SNMP agent 55 and the XP interface 51.

[Workstations]

Figure 4:
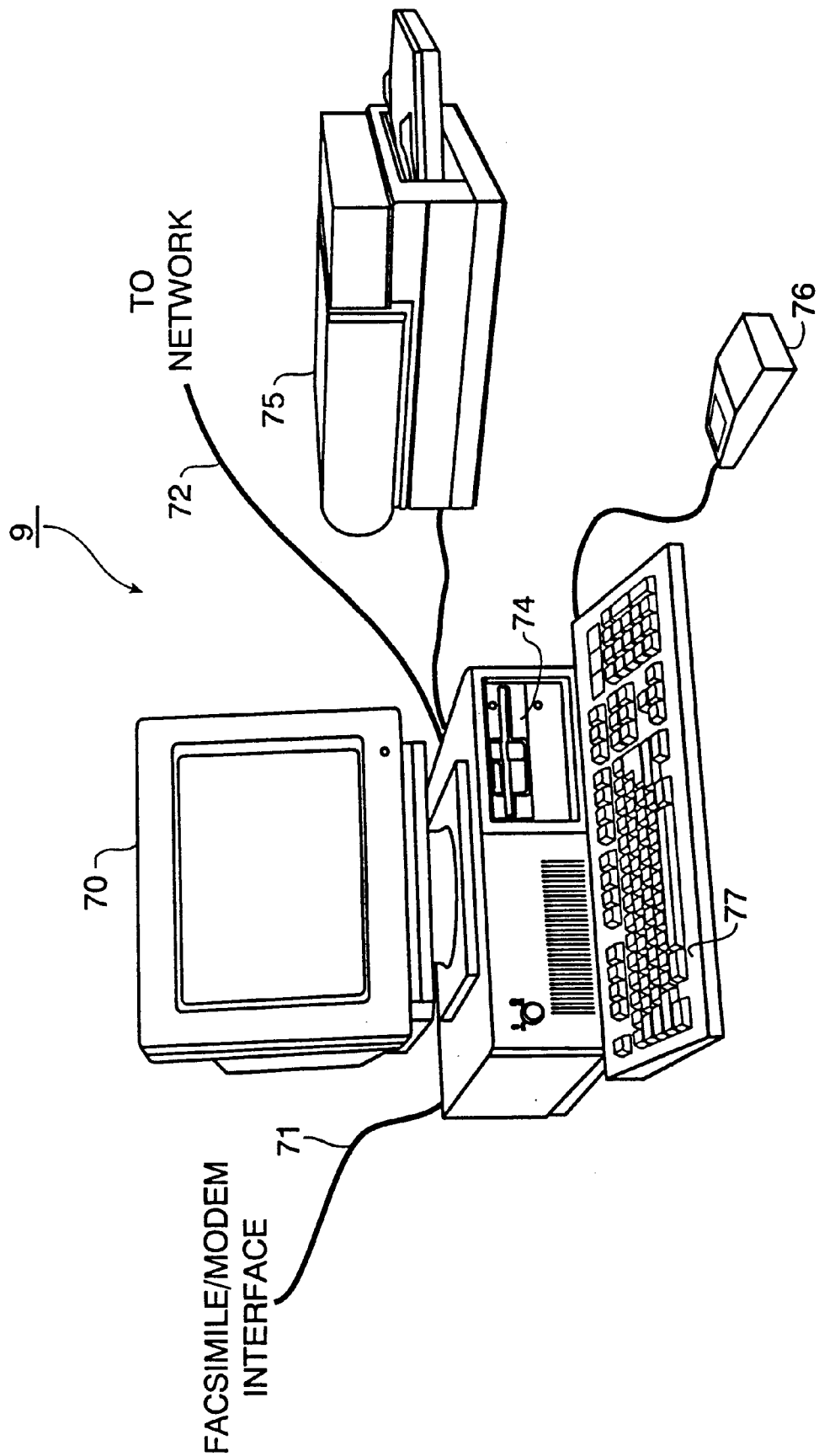
FIG. 4 is a perspective view showing the outward appearance of a workstation used in the present invention.

FIG. 4 is a view showing the outward appearance of a representative embodiment of a workstation utilizing the present invention. Shown in FIG. 4 is a workstation 9, such as a MacIntosh or an IBM PC or PC-compatible computer having a windowing environment, such as Microsoft Windows. Provided with the workstation 9 is a display screen 70, such as a color monitor, a keyboard 77 for entering user commands, and a pointing device 76, such as a mouse, for pointing to and for manipulating objects displayed on the screen 70.

The workstation 9 includes a mass storage device such as a computer disk 74 for storing data files. The workstation communicates to other external devices via a facsimile/modem interface 71. Such external devices might include an internet service provider for providing alternate connection means to Web 6. A printer 75 is provided for hardcopy output.

Figure 5:
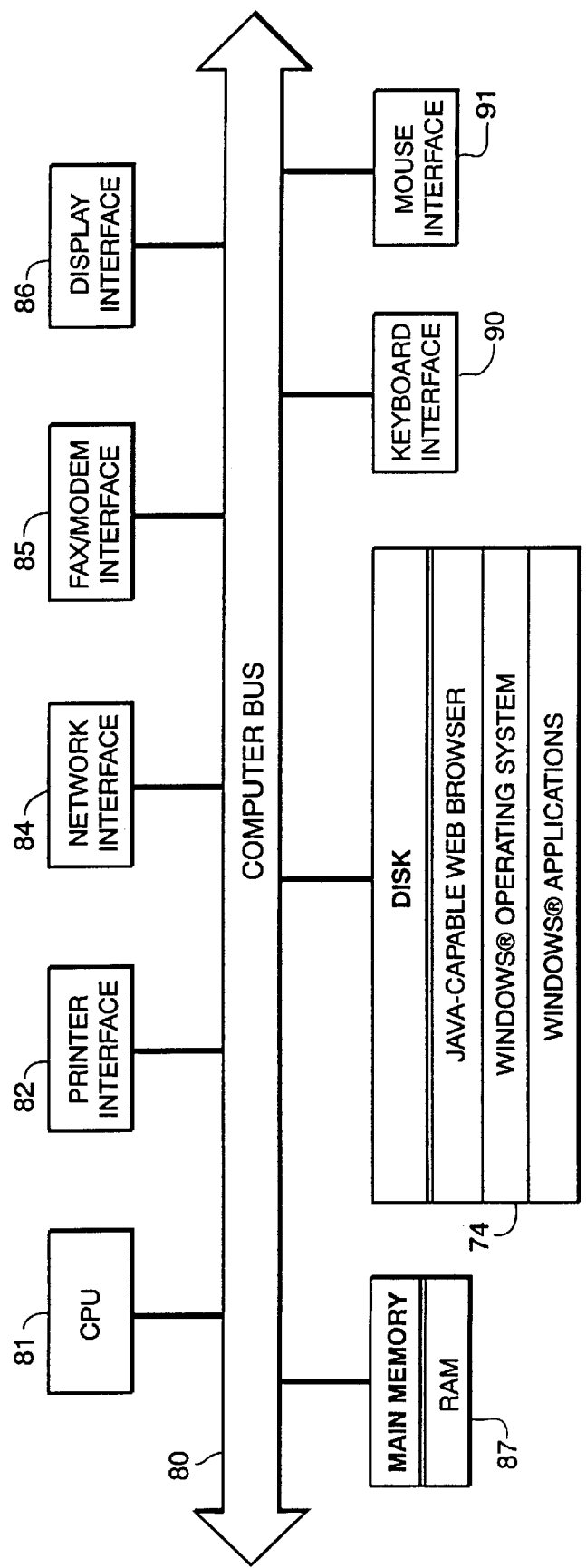
FIG. 5 is a block diagram of a user's workstation.

FIG. 5 is a detailed block diagram showing the internal construction of the workstation 9. As shown in FIG. 5, the workstation 9 includes a central processing unit (CPU) 81 interfaced with a computer bus 80. Also interfaced with the computer bus 80 is a printer interface 82, a network interface 84, a fax/modem interface 85, a display interface 86, a keyboard interface 90, a mouse interface 91, a main memory 87, and a fixed disk 74. Disk 74 stores a JAVA-enabled web browser, a Windows Operating System and various Windows applications. The web browser communicates to the LAN 15 and to the World Wide Web 6 through a network interface 72. The main memory 87 interfaces with the computer bus 80 so as to provide random access memory storage for use by the CPU 81 while executing stored process steps such as those of the web browser. More specifically, the CPU 81 loads those process steps from the disk 74 into the main memory 82 and executes those stored process steps out of the main memory 82.

Figure 6:
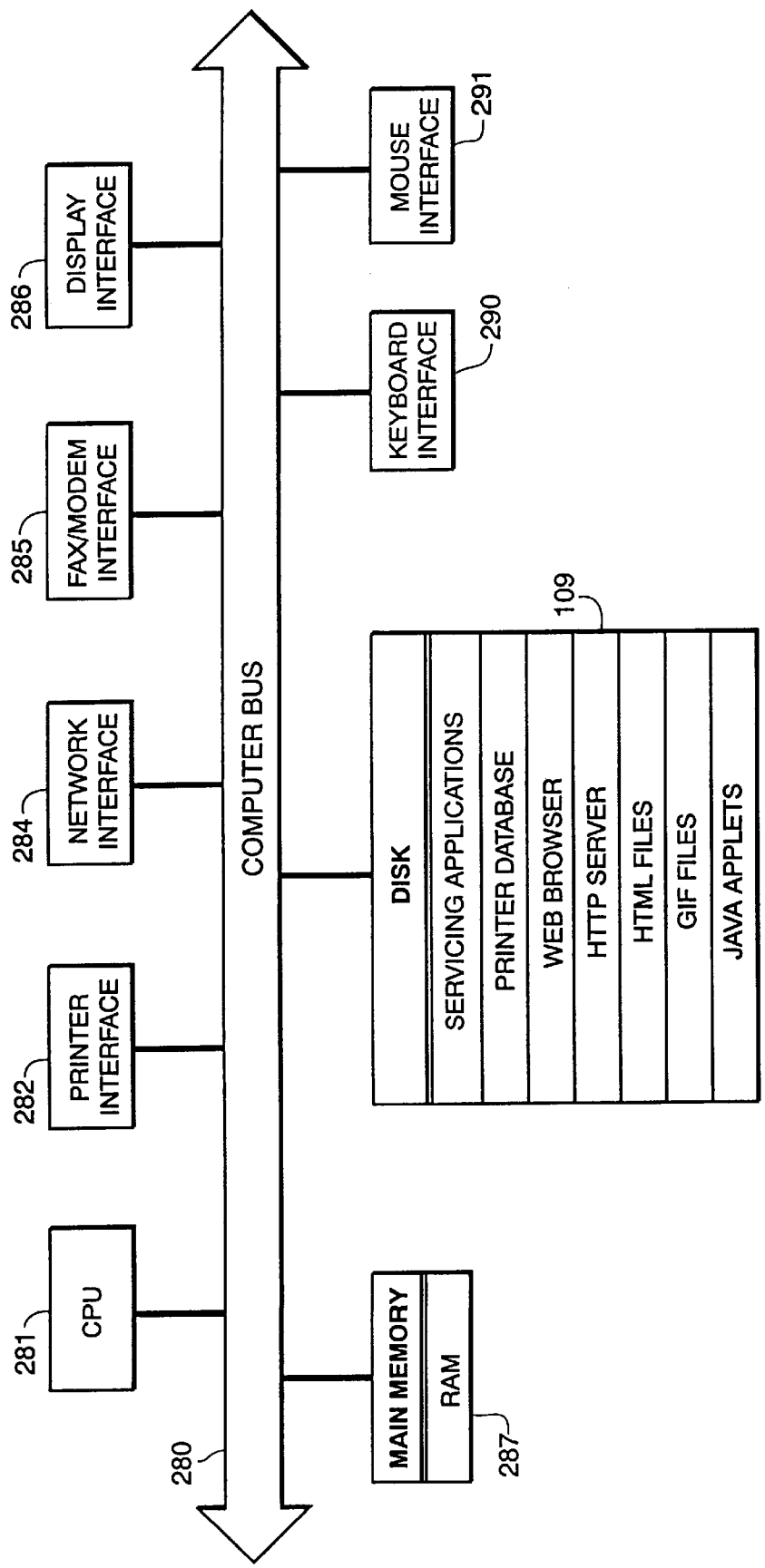
FIG. 6 is a block diagram of a technical support operator's workstation.

FIG. 6 is a block diagram of the Technical Support workstation 1. The workstation of FIG. 6 is comprised of the same general components as the workstation of FIG. 5 with the exception of the data stored on the disk 109. In particular, the disk 109 contains an HTTP server, HTML files, GIF files and JAVA applets, in addition to a Web browser.

[Method and Apparatus for Communicating with A Network Peripheral]

Figure 7:
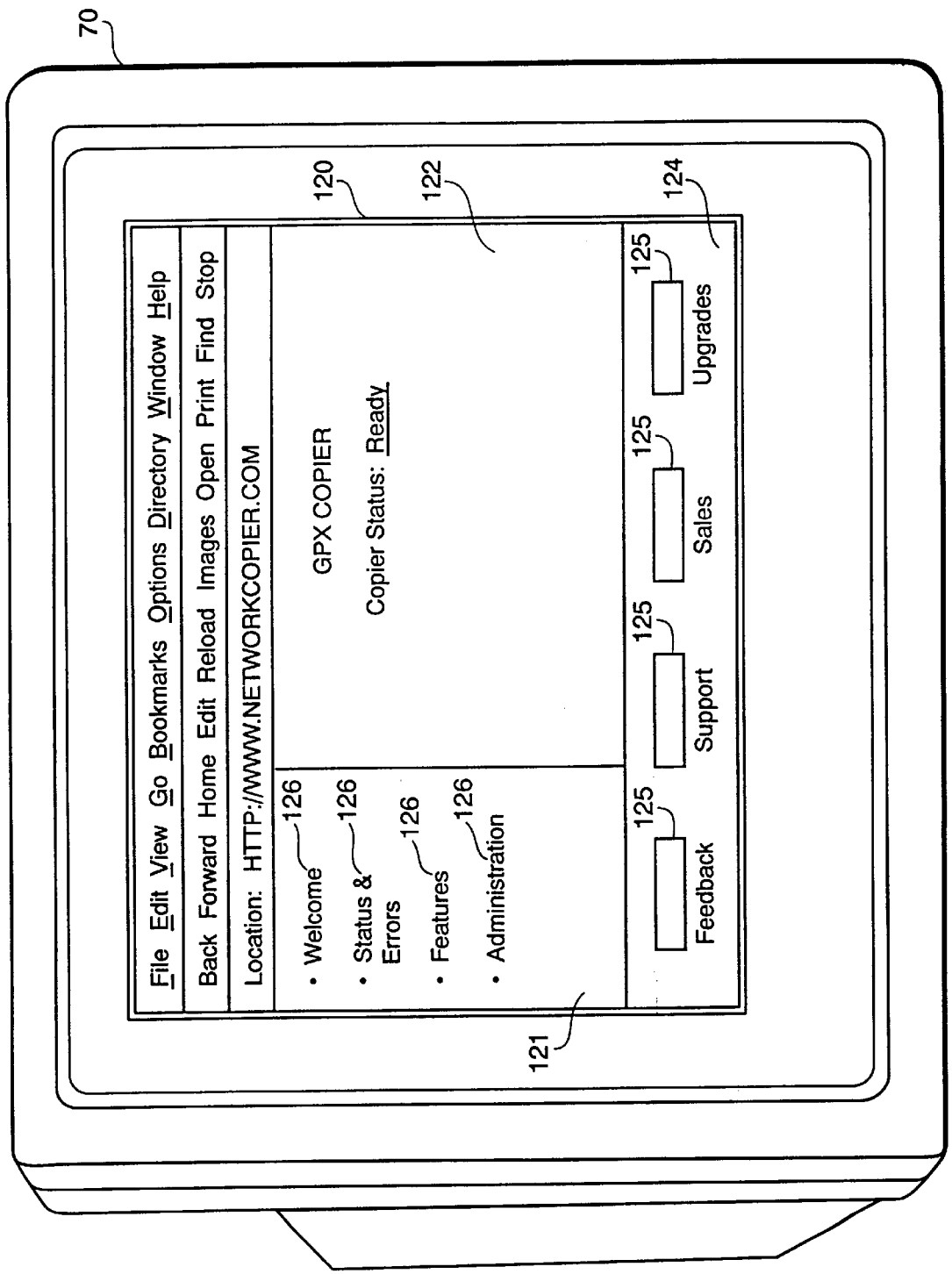
FIG. 7 is a copier home page as displayed by an Internet browser.

FIG. 7 is a home page 120 of the HTTP server 64 located on the NIB 14, as displayed by a browser on the display 70. The page 120 includes a Tab Frame 121, a Viewer Frame 122 and an External Link Frame 124.

The Tab Frame 121 includes icons 126 representing other HTML pages which are available from the HTTP server 64. As will be discussed below, the Tab Frame 121 is a fixed component of the copier web pages, therefore the Tab Frame icons 126 are available from any page provided by the HTTP server 64.

The External Link Frame 124 includes icons 125 which provide access to the HTTP servers located within workstations 1 and 4. Like the Tab Frame icons 126, these icons 125 are available from any page provided by the HTTP server 64.

FIG. 8 is a hardcopy of an HTML file 130 corresponding to the copier home page 120. The file contains hypertext tags 131, 132 and 134, which are links to HTML files corresponding to the Tab Frame 121, the Viewer Frame 122 and the External Link Frame 124, respectively.

FIG. 9 is a hardcopy of an HTML file 140 corresponding to the Tab Frame 121. The file 140 contains a tag 141 directing a browser to display the user options, which will be confined to the left side of the browser display area, as defined by the home page HTML file 130. More importantly, the file 140 contains an applet tag 142, which refers to a JAVA applet located on the HTTP server 64. The browser, when processing the file 140, requests the applet from the HTTP server 64 upon encountering the applet tag 142. The Tab Frame applet waits for user action on the Tab Frame 121 and responds with appropriate actions.

Figure 10:
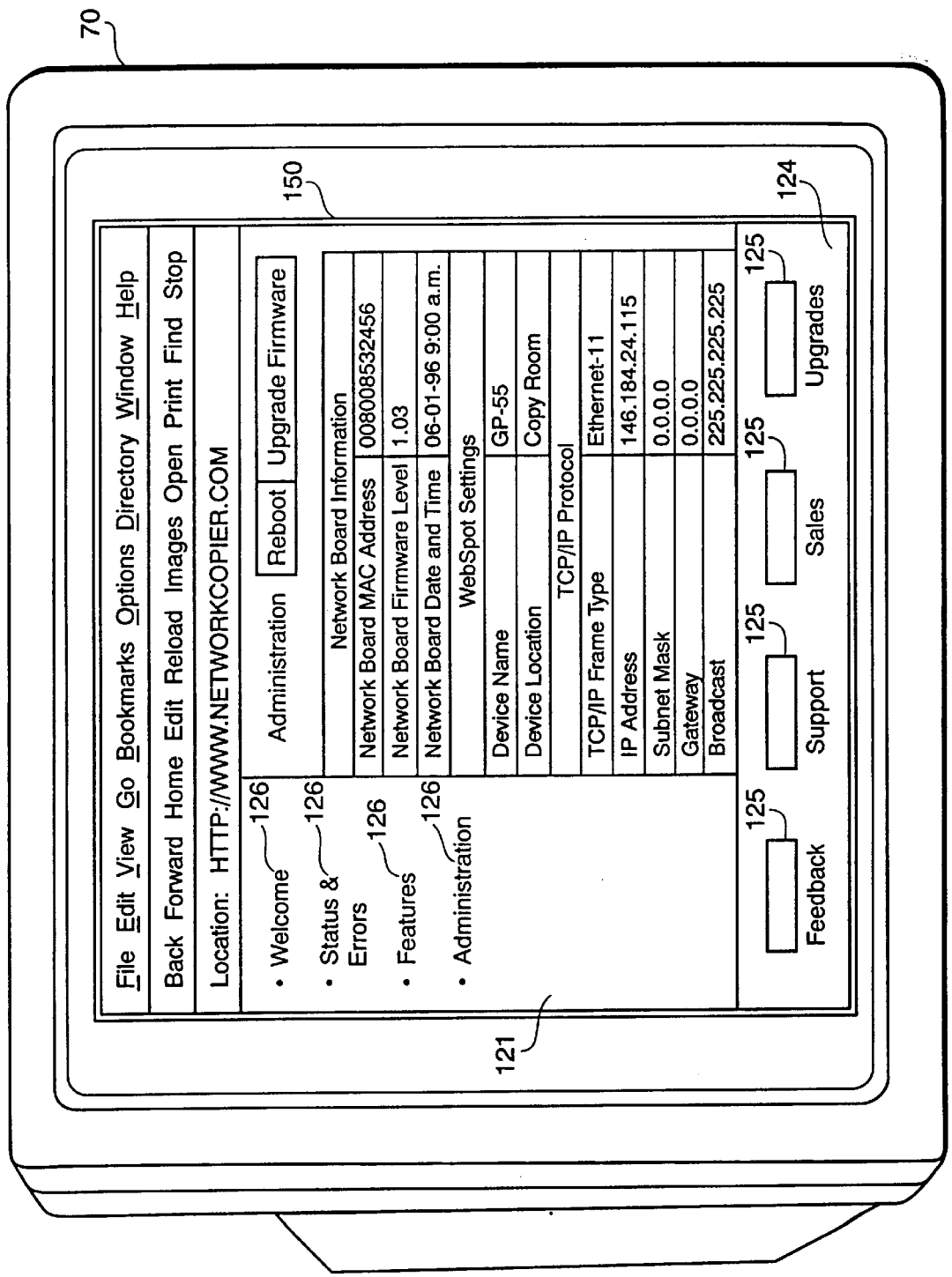
FIG. 10 is an "Administration" web page as displayed by a browser.

FIG. 10 is an "Administration" HTML page 150 downloaded from the HTTP server 64, as displayed within a browser. Current configuration settings are displayed in fields such as fields 152, 154 and 155 using an applet downloaded from the HTTP server 64. The settings are obtained by an SNMP client within the workstation from an SNMP agent 68 within the HTTP server 64. Furthermore, the page 150 contains icons 151 which, when selected, cause administrative functions to be executed within the copier 11.

FIG. 11 is an HTML file 160 corresponding to the "Administration" web page 150. The file contains applet tags 161, 162 and 164, which, when encountered by a browser, cause corresponding applets to be downloaded from the HTTP server 64 and executed. Upon execution, these applets present icons 151 to a user and monitor the icons 151 for user selection. If an icon 151 is selected, the corresponding applet, which has been waiting for such a selection, executes the corresponding administrative function within the copier.

Figure 12:
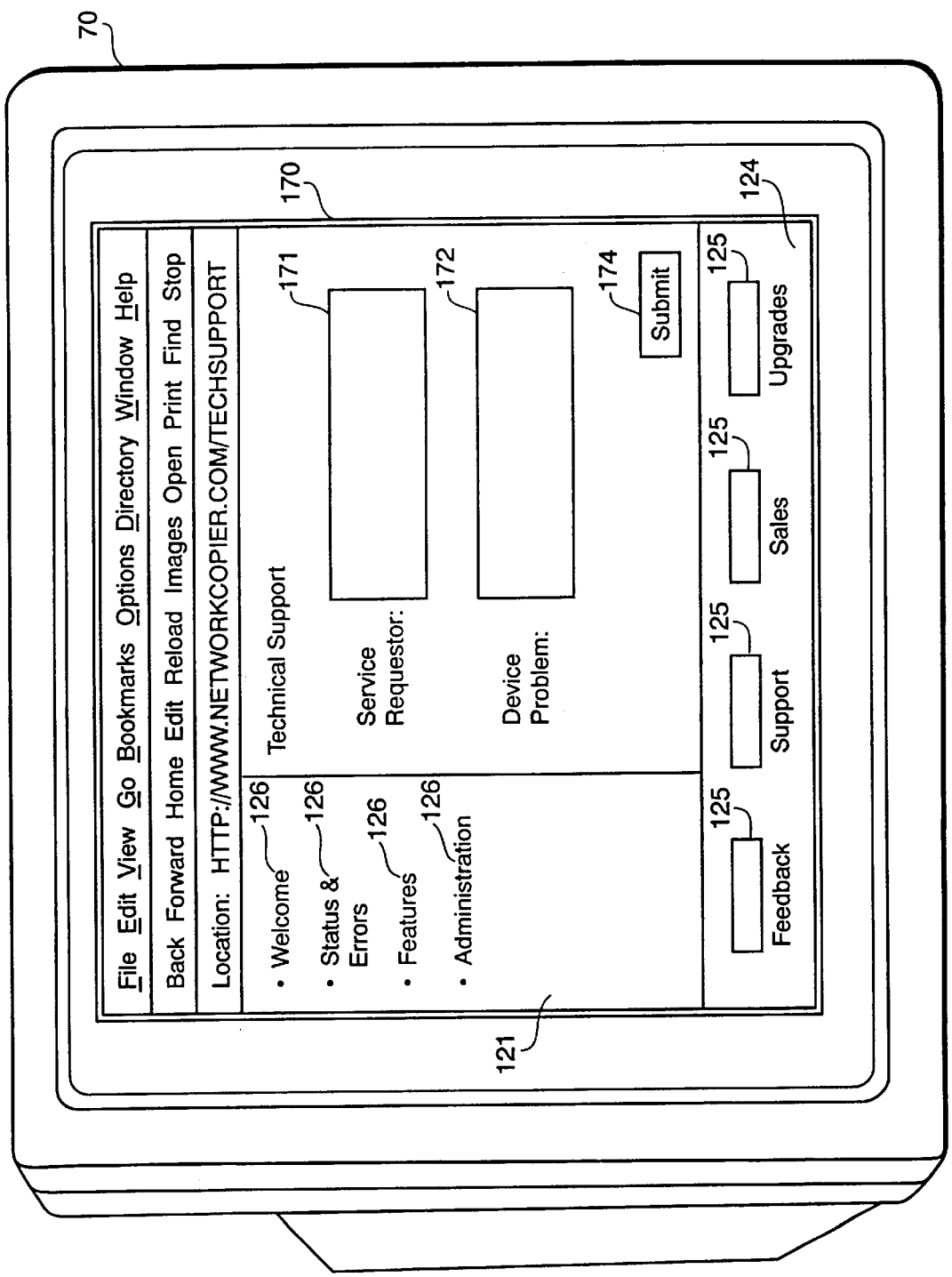
FIG. 12 is a Technical Support server home page as displayed by a browser.

FIG. 12 is a home page of a Technical Support server 1 as displayed by a browser. The page 170 contains fields 171 and 172 which may be completed dynamically via JAVA applets downloaded from the Technical Support server 1 or from the HTTP server 68. Alternatively, these fields may be completed manually by a user. In any case, the data in these fields is converted to CGI format and sent in an IP packet to the Technical Support server 1 upon user selection of "submit" icon 174.

Figures 13, 13A:
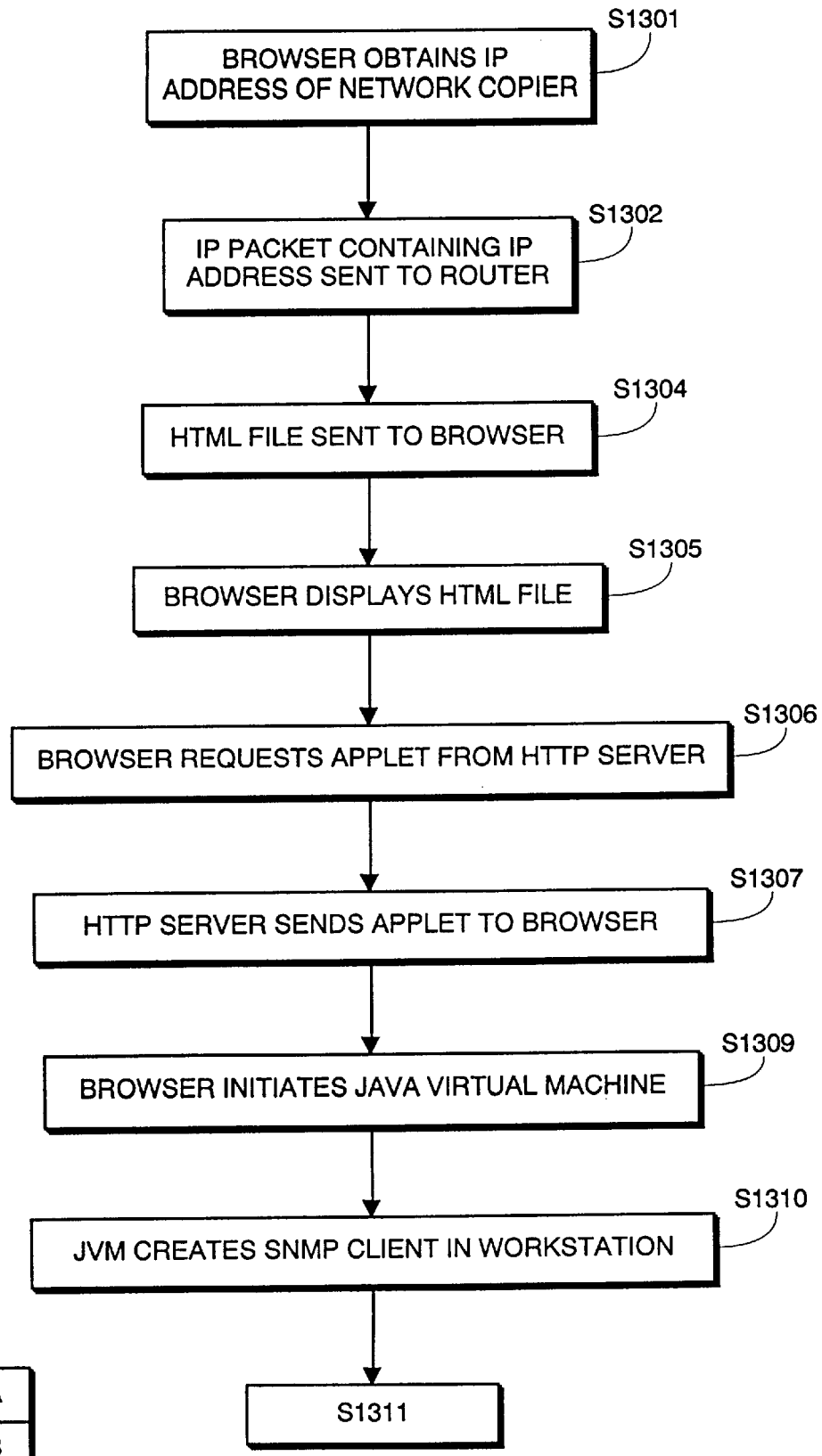
FIG. 13 is a flowchart for describing process steps to create an SNMP client in a workstation and to reboot a copier via the SNMP client.
Figure 13B:
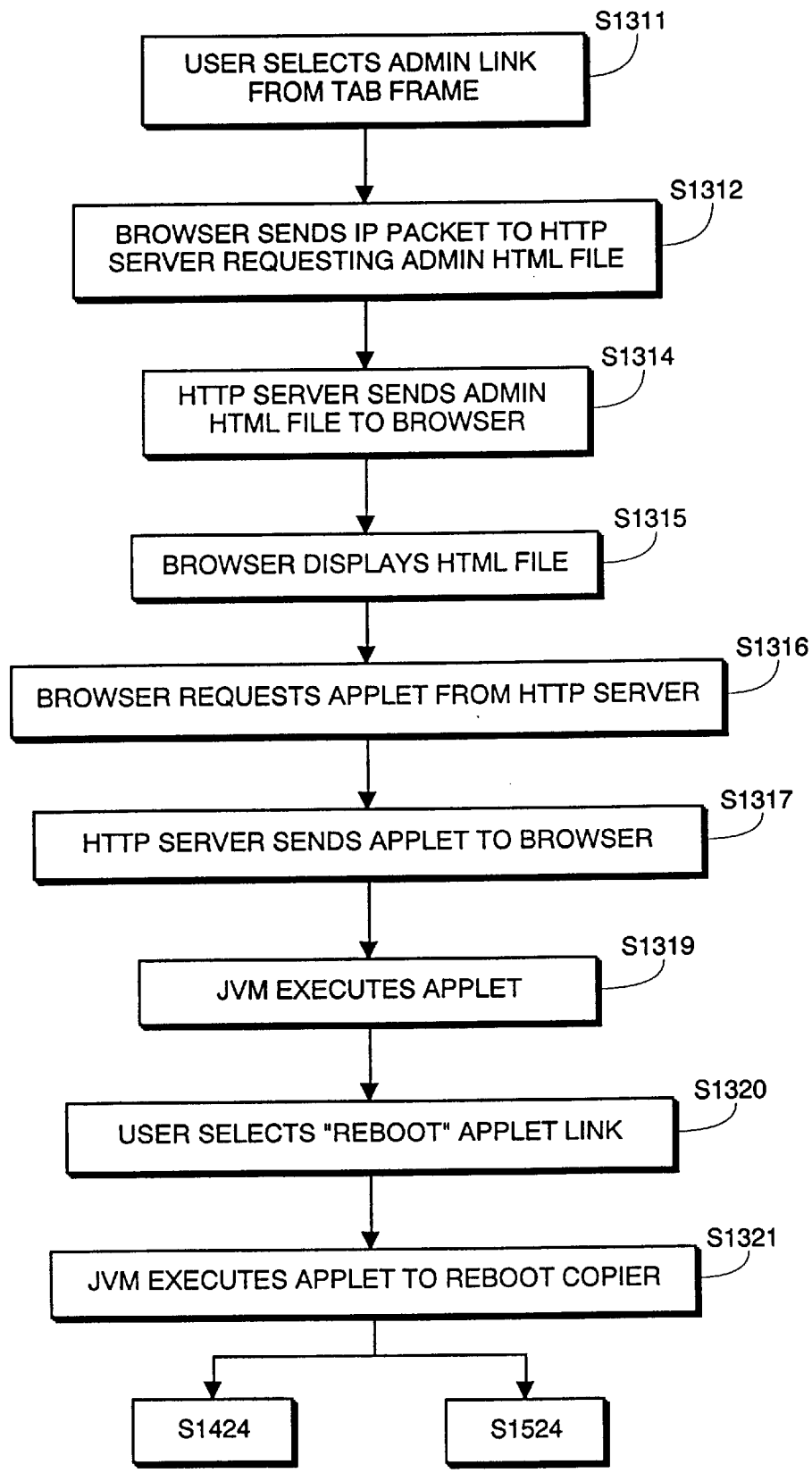

FIG. 13 is a flowchart for describing process steps to create an SNMP client in a workstation and to reboot a copier via the SNMP client. Generally speaking, the process steps of FIG. 13 provide communication between a web browser capable of initiating execution of a platform-independent segment of executable code and a peripheral having an HTTP server and an SNMP agent. A first IP-packet is transferred to the HTTP server, and, in response, an HTML file is transmitted to the web browser. The HTML file contains a reference to a platform-independent segment of executable code. Upon processing the HTML file, this code segment is requested from the HTTP server.

After the web browser receives the executable code from the HTTP server, execution of the code segment is initiated in order to create an SNMP client. Execution of the code segment also causes an IP-packet to be sent from the SNMP client to the SNMP agent in the peripheral. In response to this IP-packet, information concerning the peripheral is transferred from the SNMP agent to the SNMP client.

More particularly, in step S1301, a web browser executing within a workstation 9 obtains an IP address of an HTTP server 64 corresponding to a network copier 11. The web browser may be any JAVA-enabled browser, such as Netscape's Navigator® 3.0, Microsoft's Internet Explorer® 3.0 or the like. Furthermore, the IP address may be obtained in several ways.

First, a user may input the IP address directly into the appropriate area of the browser's graphical user interface. Alternatively, the browser may obtain the IP address using a name which corresponds to a World Wide Web home page located within the HTTP server 64 of the network copier 11. According to this alternative, the name is sent in an IP packet from the web browser to a domain name server, which returns the home page's IP address to the web browser.

Next, in step S1302, the web browser sends an IP packet containing the returned IP address to the router 7, which routs the packet to the HTTP server 64. In response to the IP packet, the HTTP server 64 sends an HTML file to the browser in step S1304. In step S1305, the web browser processes and displays the HTML file in accordance with hypertext tags contained in the file.

As shown in FIGS. 7 to 9, the hypertext tags provide page formatting information to the browser which defines text areas, graphics areas or JAVA client areas. For example, upon processing HTML file 130, the browser is instructed by hypertext tag 131 to display a second HTML file 140 at the left side of the displayed page 120. This HTML file 140 represents Tab Frame 121. Further, hypertext tag 132 instructs the browser to display a third HTML file on the right side of the displayed page 120. The third HTML file represents the Viewer Frame 122 and is dynamically created by the HTTP server 64 so that it presents the current status of the copier when displayed.

In the case that a browser encounters a graphics tag which designates an image to be displayed, the browser retrieves the image according to the location provided in the tag and displays the image in the browser display area designated by the tag. Similarly, in the case that a browser encounters a JAVA applet tag, the browser retrieves the segment of JAVA applet code according to the location provided in the tag and, also according to the tag, reserves a client area of the display area in which the JAVA applet may display data. The browser then initiates a JAVA Virtual Machine ("JVM") to execute the applet.

In step S1306, because the browser encounters a JAVA applet tag 142 while processing the HTML file 140 corresponding to the Tab Frame 121, the browser sends an IP packet to the HTTP server 64 requesting the referenced applet. Accordingly, in step S1307, the HTTP server 64 returns the applet to the browser.

The browser, in step S1309, initiates a JAVA Virtual Machine in order to execute the JAVA applet. The applet is executed in step S1310, thereby creating an SNMP client in the workstation 9 and waiting for user selection of one of the icons 126 displayed in the Tab Frame 121.

In step S1311, the user, using the mouse 76, selects the "Admin" icon displayed in the Tab Frame 121. The "Admin" icon is a hypertext link to the "Admin" page located on the HTTP server 64. Therefore, the browser, in step S1312, sends an IP packet to the HTTP server 64 requesting the "Admin" page's HTML file 160, shown in FIG. 10. The server 64 sends the HTML file 160 to the browser in step S1314.

In step S1315, the browser processes the HTML file 160 according to its hypertext tags, which instruct the browser to display the file in the Viewer Area 122. The browser also reserves client areas 152, 154 and 155 according to the HTML file's applet tags 165. Also in accordance with the applet tag 165, the browser requests the referenced applet from the HTTP server 64 in step S1316. The HTTP server transfers the applet to the browser in step S1317.

In step S1319, the JVM executes the applet to obtain information from the copier 11 using the SNMP client created in step S1310. In particular, the JVM instructs the SNMP client to send an IP packet requesting copier information to the SNMP agent 68 within the network copier 11. The SNMP client then sends the IP packet to the SNMP agent 68 using the IP address obtained in step S1301. However, the SNMP agent has a different socket number than that of the HTTP server 64. Accordingly, the SNMP client simply sends the IP packet to the IP address obtained in step S1301, along with a reference to the SNMP agent's socket.

In response to the IP packet, the SNMP agent 68 returns the requested copier information, using SNMP protocol, to the SNMP client. The JVM then displays the information in the appropriate areas 152, 154 and 155 of the "Admin" page 150.

In step S1320, after the "Admin" page 150 and corresponding copier information have been displayed, the user selects the "Reboot The Copier" icon 151. The "Reboot" and "Upgrade Firmware" icons 151 are not hypertext links, rather, these icons are displayed by JAVA applets 161, 162 and 164. Accordingly, in step S1321, once selected the applet which displays the "Reboot" icon 151 is executed so as to cause the SNMP client to instruct the SNMP agent 68 to reboot the copier 11.

It should be noted that the preceding steps S1311 to S1321 are described with respect to the "Admin" page 150 only to provide an example of its functionality, and that any copier information pages may employ similar functionality.

[Accessing Peripheral Web Pages Via Hypertext Links]

In one aspect, flow proceeds from step S1321 to step S1424. In step S1424, the user, using the mouse 76, selects the "Support" icon displayed in the External Link Frame 124 of the "Admin" page 151. Next, in step S1425, the browser sends an IP packet to a Technical Support server 1 requesting the server's home page 170. The Technical Support server's IP address is obtained either directly from the currently displayed HTML file or according to the Technical Support server's domain name, as described above with respect to step S1201.

In step S1426, the Technical Support server 1 returns an HTML file to the browser, which in turn displays a home page 170 corresponding to the HTML file. The home page 170 contains HTML tags which instruct the browser to display, in step S1427, the page 170 within the Viewer Frame 122 of the browser display. The page 170 contains user input fields 171 and 172.

If, in step S1429, the browser encounters any applet tags within the Technical Support HTML file, flow proceeds to step S1430, in which the browser retrieves the referenced applets from the Technical Support server 1. Next, in step S1431, the JVM executes the applets in order to obtain copier information via the SNMP protocol and to fill in the appropriate copier information fields 171 and 172 the page 170 with the copier information.

The applets which allow the SNMP client to retrieve copier information are downloaded only when first encountered. Thereafter, in the case that the user revisits the page, the applet can be executed immediately and thereby can update the page quickly. In contrast, PhaserLink requires an HTTP server to rescript an HTML file in accordance with copier status each time a page corresponding to the file is summoned by a browser.

Flow proceeds from step S1431 to step S1432. If, in step S1429, no applet tags are encountered, flow also proceeds to step S1432.

In step S1432, the user manually inputs data into user input fields 171 and 172. The web browser converts this data into CGI format in step S1434. Thereafter, in step S1435, the browser sends a new IP packet to the Technical Support server which is identical to the packet sent in step S1425 except that the new packet also contains the CGI-formatted data. The process steps of FIG. 14 terminate in step S1436.

[Accessing Peripheral Web Pages Via Peripheral Applets]

In another aspect, flow proceeds from step S1321 to step S1524, wherein the "Support" icon 125 displayed in the External Link Frame 124 is not a hypertext link to a Technical Support server 1, rather, the icon is displayed by a JAVA applet retrieved from the HTTP server 64 upon processing the External Link Frame HTML file. In step S1524, the user selects this icon 125.

In accordance with the applet, the JVM instructs the browser to access a Technical Support server in step S1525. In step S1526, the browser issues an IP packet in order to obtain the Technical Support server's home page 170. The Technical Support server's IP address may be obtained through either method described above with respect to step S1425.

In step S1527, the Technical Support server 1 returns an HTML file which defines the Technical Support server's home page 170. The HTML file instructs the web browser to display the home page 170 in the Viewer Frame 122 of the browser display. The home page 170 also contains areas for inputting copier information. Accordingly, in step S1529, the JVM executes the "Support" applet in order to obtain copier information from the SNMP agent 68 via the SNMP client, as described in view of step S1319. Then, in step S1530, the JVM executes the applet so as to input the copier information into the appropriate areas of the page 170.

As mentioned above, the applets which allow the SNMP client to retrieve copier information are downloaded only once. If the user revisits the page, the applet is executed immediately and the page is updated quickly. In contrast, PhaserLink requires an HTTP server to rescript an HTML file in accordance with copier status each time the file is requested by a browser.

If necessary, in step S1531, the user manually inputs user information into user input areas of the page 170. In step S1532, the user selects a "Submit" icon (not shown) in the home page 170. In response, the applet instructs the browser to convert the information input into the page 170 into CGI format in step S1534. Next, in step S1535, the browser sends an IP packet to the Technical Support server 1. The IP packet is identical to the packet sent to the server 1 in step S1526 except that the packet also contains the CGI-formatted information.

It should be noted that the applet may be used to obtain any data via the SNMP agent and to convert that data into CGI format for delivery to the Technical Support server, whether or not the data is displayed to the user.

Figure 14:
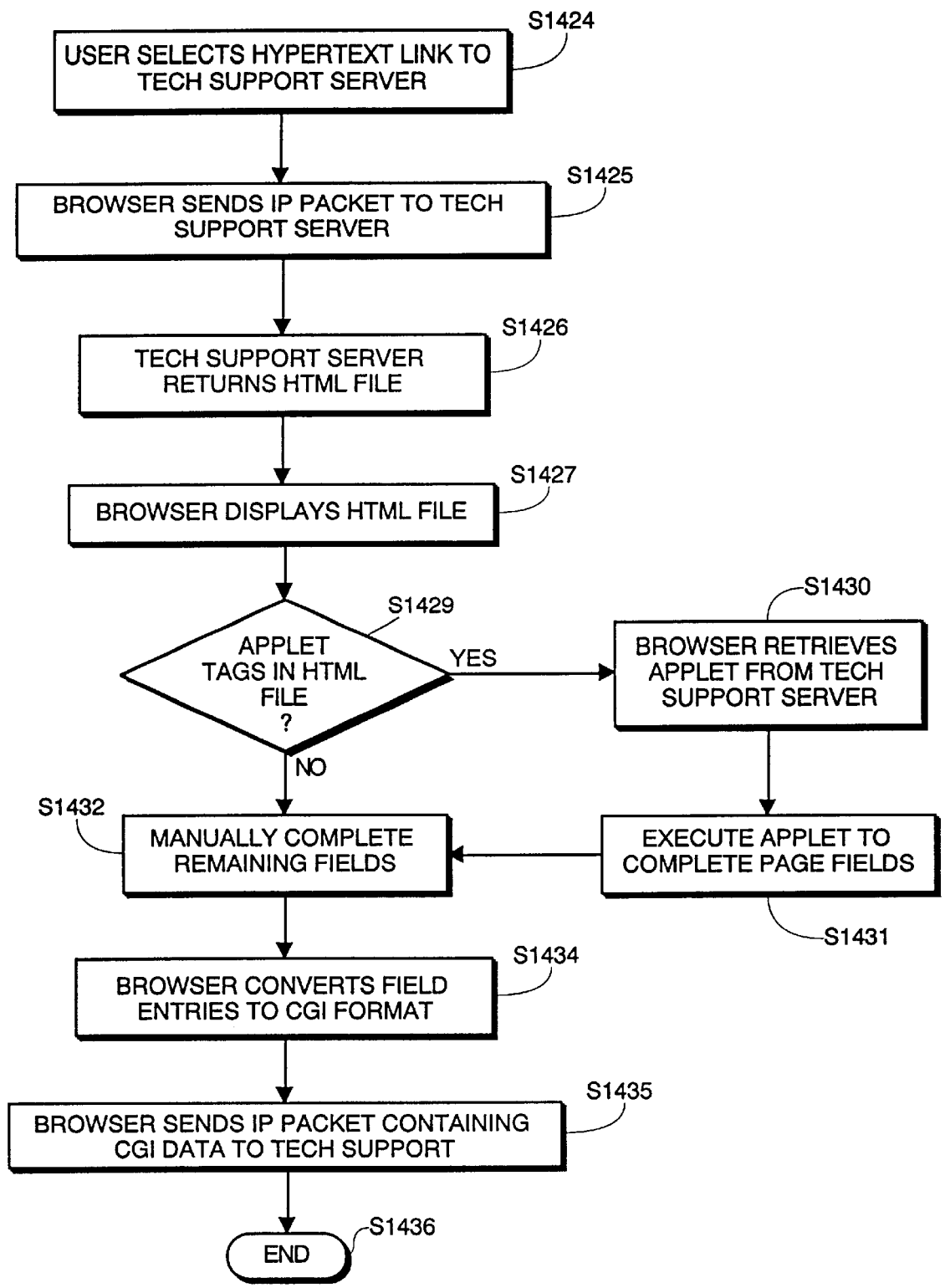
FIG. 14 is a flowchart for describing process steps to send copier information to a technical support organization.
Figure 15:
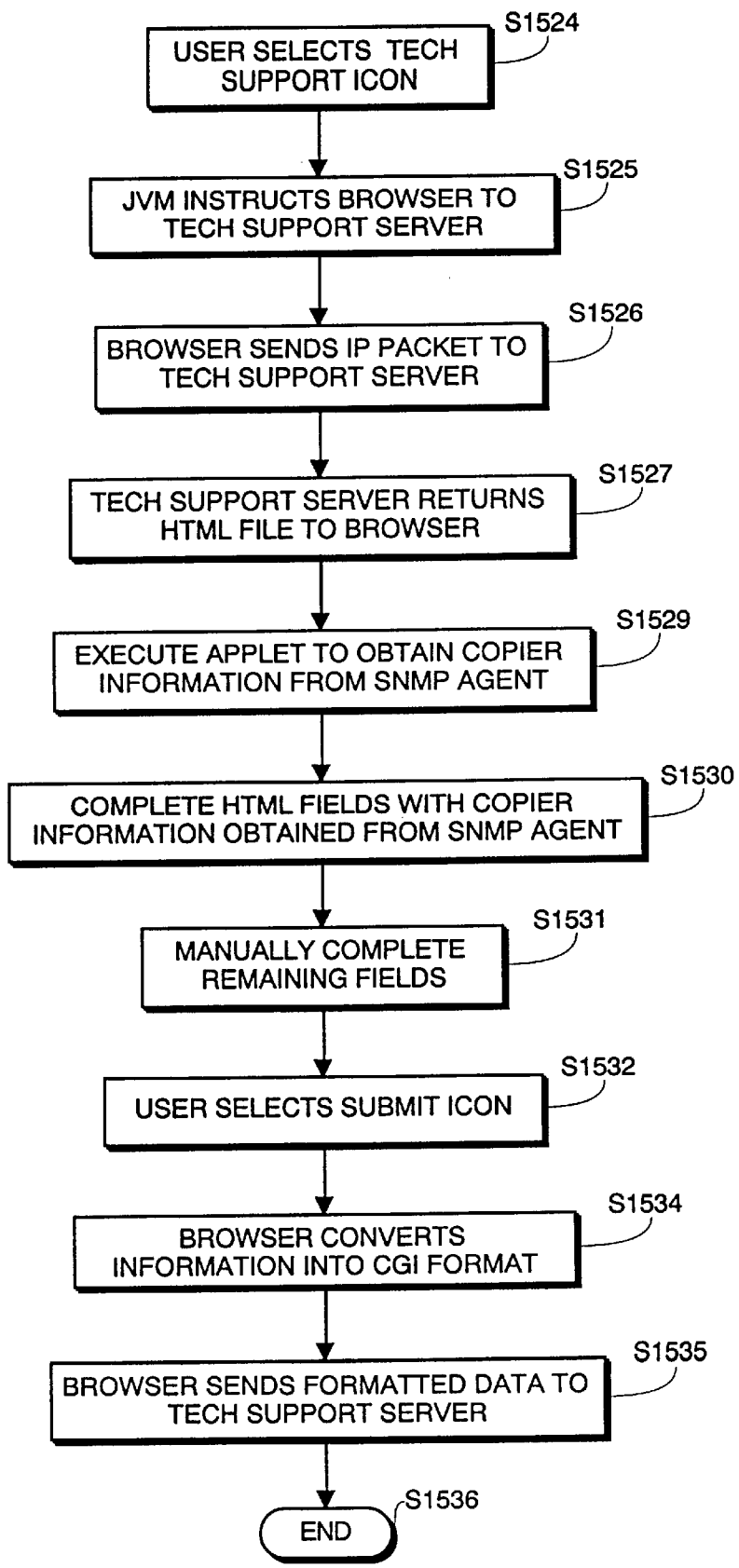
FIG. 15 is a flowchart for describing process steps to send copier information to a technical support organization.

In addition, although JAVA applets have been described, it should be understood that the process steps of FIGS. 13 to 15 may be used in conjunction with any code which is retrievable and executable via a web browser.

[Remote Maintenance and Servicing of Network Peripherals]

Figure 16:
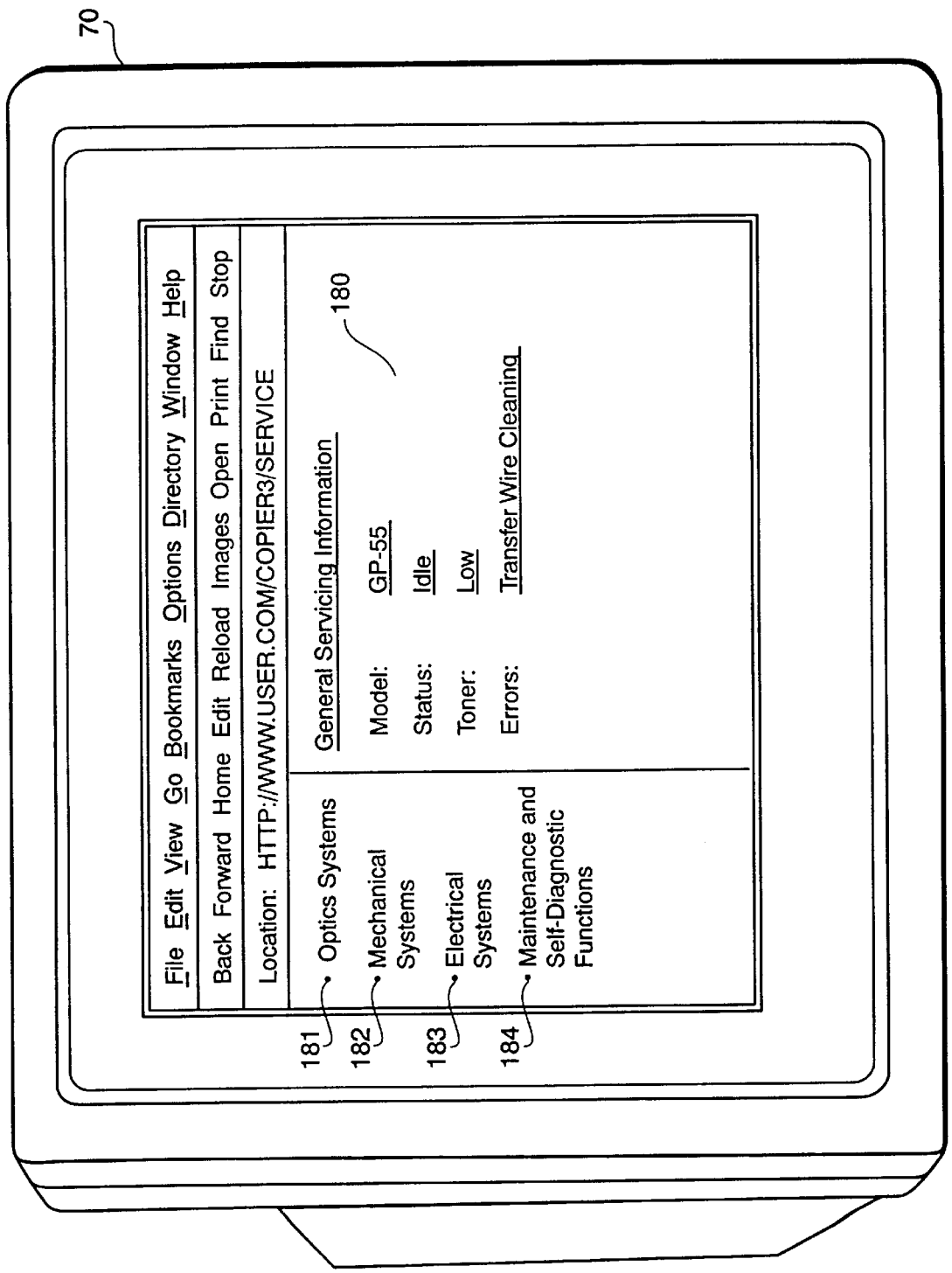
FIG. 16 depicts a Web page for providing servicing information generated by a network copier in response to a service organization request.

FIG. 16 depicts a Web page for providing servicing information generated by a network copier in response to a service organization request. General servicing information 180 is provided for the service technician's review. In addition, links 181 through 184 can be selected by the technician to bring up additional copier servicing pages. For example, in the event link 184 is selected, the page depicted in FIG. 17 is retrieved.

Figure 17:
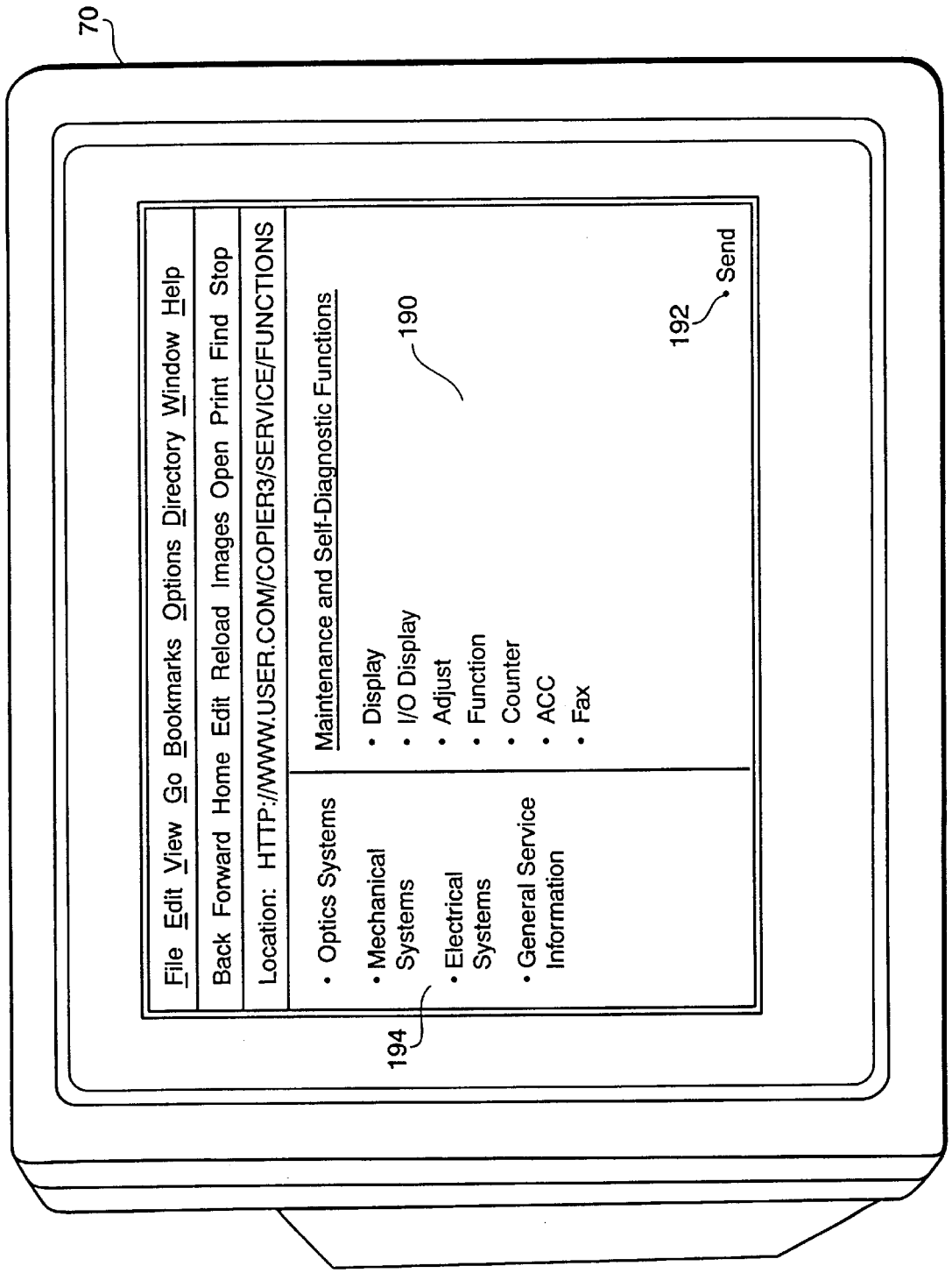
FIG. 17 depicts a Web page showing maintenance and diagnostic functions available to be executed by a network copier.

FIG. 17 depicts a Web page showing maintenance and diagnostic functions available to be executed by a copier 11. When any of buttons 190 are selected and then the send button 192 is selected, network copier 11 performs the corresponding diagnostic or maintenance functions. In addition, by selecting any one of links 194, the corresponding page can be retrieved.

Figure 18:
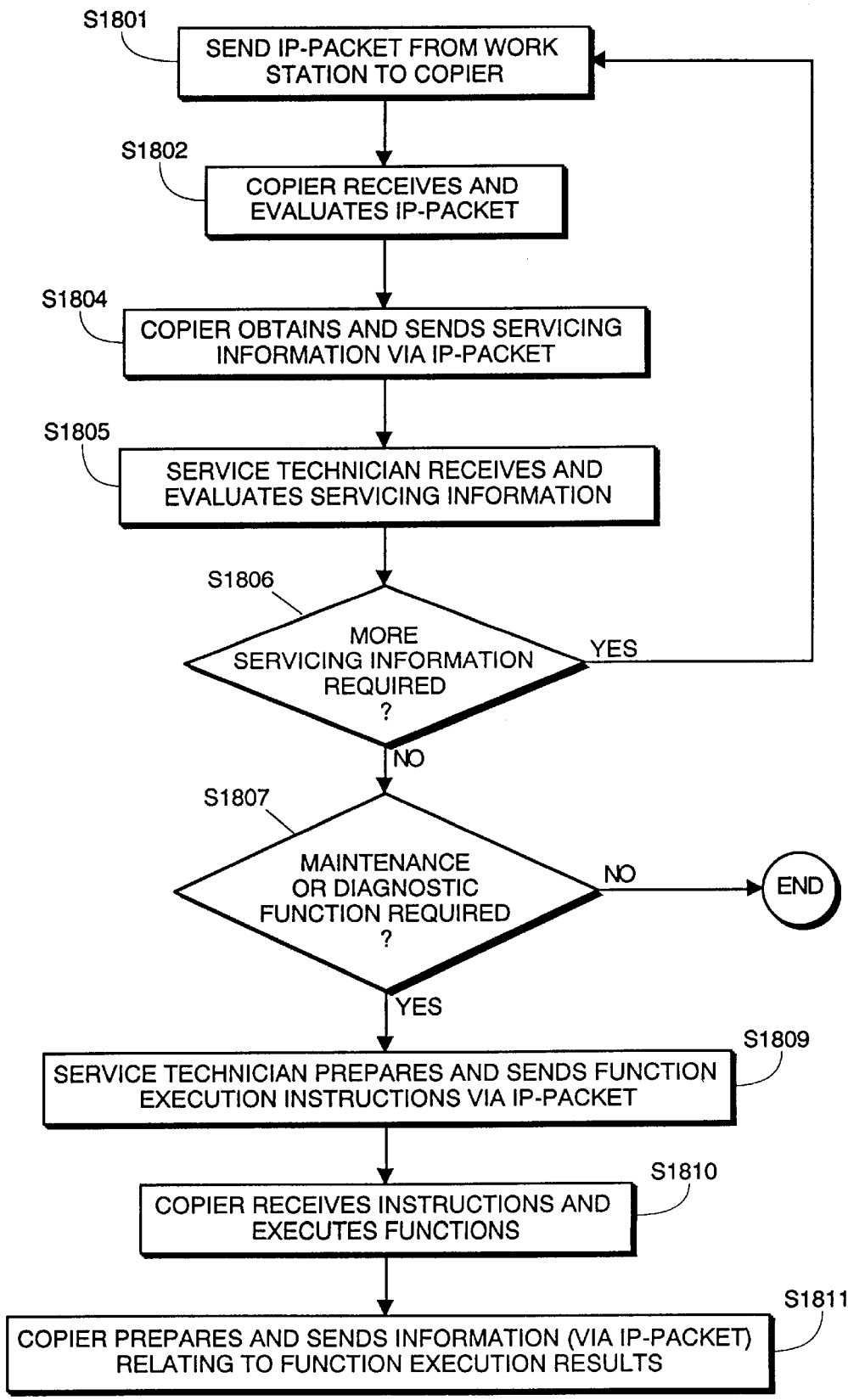
FIG. 18 is a flowchart for describing a method for performing remote maintenance and servicing of a network copier over the internet.

FIG. 18 is a flowchart illustrating a process steps for performing remote maintenance and servicing of copier 11 over the internet by a service technician working at workstation 1.

In general, according to the process steps in FIG. 6, a first IP-packet sent from a remote service organization is received by a network peripheral device via the IP-network, the first IP-packet including a request for servicing information from the network peripheral device. Next a second IP-packet is sent automatically upon receipt of the first IP-packet from the network peripheral device to the remote service organization via the IP-network, the second IP-packet including the requested peripheral servicing information. Thereafter, a third IP-packet sent from the remote service organization to the network peripheral device via the IP-network is received by the network peripheral device, the third IP-packet including an instruction to execute a peripheral servicing function. Finally, the peripheral servicing function is executed by the network peripheral device automatically in response to the third IP-packet.

More particularly, in step S1801, a service technician operating workstation 1 initiates contact with copier 11 by causing workstation 1 to prepare and send an IP-packet to NIB 14 coupled to copier 11. The IP-packet contains a request for servicing information from network copier 11.

In the following description, the service technician runs a Web browser on workstation 1, and NIB 14, connected to copier 11, includes an HTTP server which is set up to provide HTML files related to maintenance communications. Accordingly, the service technician can initiate contact with copier 11 by merely entering the address of the maintenance and servicing Web page of copier 11 into the browser and executing the browser. Similarly, it is expected that data will be returned in HTML file format. However, it is to be understood that the data format used is not limited to HTML.

Once generated, the IP-packet is sent from workstation 1 to NIB 14 successively via router 2, world wide web 6, router 7 and LAN 15, as described in more detail above. NIB 14 then unpacks the IP-packet and passes the data contained in it to copier 11 via XP interface 51.

In step S1802, copier 11 receives and evaluates the request to determine what data is required to be sent.

In step S1804, based on the evaluation in step S1802, copier 11 then retrieves and outputs the data to NIB 14. NIB 14, in turn, then includes the received data in an HTML file using one of the stored HTTP files 65 and its HTTP server 64, and includes the HTML file in an IP-packet. The generated IP-packet, which includes in its destination field the address of workstation 1, is then sent from NIB 14 to workstation 1 successively via LAN 15, router 7, World Wide Web 6 and router 2.

In step S1805, the IP-packet is received by workstation 1. The HTML page, including the data provided by copier 11, within the packet is then displayed by the Web browser according to the instructions sent. For example, the initial contact would typically have constituted a request to view a general servicing information page of copier 11 illustrated in FIG. 16. As depicted in FIG. 16, the Web page 100 contains general servicing information 180 and links 181 through 184 to other pages. The service technician evaluates the displayed data to determine how to proceed next.

In step S1806, if the service technician determines that additional servicing information is required, flow returns to step S1801 to request such additional information. The specific servicing information requested might depend upon the service technician's original motivation for initiating contact with copier 11 and any previous information obtained from copier 11. For example, the technician might request more general information when initially performing scheduled maintenance than when the technician has been alerted to the existence of a specific problem.

Such requests for additional servicing information could be initiated, for example, by using mouse 76 to click on any of links 181 through 184 to select the desired page, which in turn might contain links to other pages. If no additional servicing information is required at this time, flow proceeds to step S1807.

In step S1807, the service technician determines whether any diagnostic or maintenance functions should be run on copier 11. If, for example, either: (i) no problem exists, (ii) the identified problems have been corrected, or (iii) the problem requires a site visit and all relevant available data has already been obtained, the technician will generally decide not to instruct execution of any additional functions. In that event, the process ceases. However, if one or more maintenance or diagnostic functions are desired to be executed, flow proceeds to step S1809.

In step S1809, the service technician clicks on link 184 to retrieve the available function page illustrated in FIG. 17, showing the maintenance and diagnostic functions available for copier 11. Upon clicking on any of buttons 190 and then send button 102, workstation 1 sends to copier 11 an IP-packet containing instructions to execute the series of functions selected in the order selected.

In step S1810, copier 11 receives the data contained in the IP-packet and executes the functions described.

In step S1811, copier 11 obtains information relating to the functions performed, and then copier 11 in connection with NIB 14 sends that information via an IP-packet containing HTML page update instructions to workstation 1. Thereafter, flow proceeds to step S1805 where the service technician evaluates the information, and determines whether additional servicing information is required or additional maintenance or diagnostic functions should be run.

As mentioned above, various data formats other than HTML might be used to implement the internet communications between workstation 1 and copier 11 described above. For example, rather than sending a complete Web page, the network peripheral could send only the relevant data, relying on the receiving station to format the information for display.

Rather than executing a Web browser, workstation 1 could instead execute software specifically designed for communicating with copier 11. In this event, graphical formatting instructions and menus of information available from copier 11 are provided in part or in whole by means of software internal to workstation 1, rather than exclusively by copier 11, as described in the steps above. Accordingly, in this case it is unnecessary to perform the steps or portions of steps described above for requesting or sending any such menu or formatting instructions.

Furthermore, the above process steps can be implemented for a system in which a password is required to access copier 11 via the internet. In this event, one or more of the requests from workstation 1 to copier 11 additionally includes such a password, and the copier's evaluation of the requests in step S1802 and S1810 additionally include the substep of evaluating the password provided to determine whether it is valid.

Alternatively, or in addition to the preceding paragraph, in a password system an additional step could be included when any packet is sent from workstation 1 to copier 11. In this additional step, the validity of the password is evaluated in router 7 in order to screen whether the IP-packet should even be passed along to LAN 15.

[Automatic Service Requests Over the World Wide Web]

Figure 19:
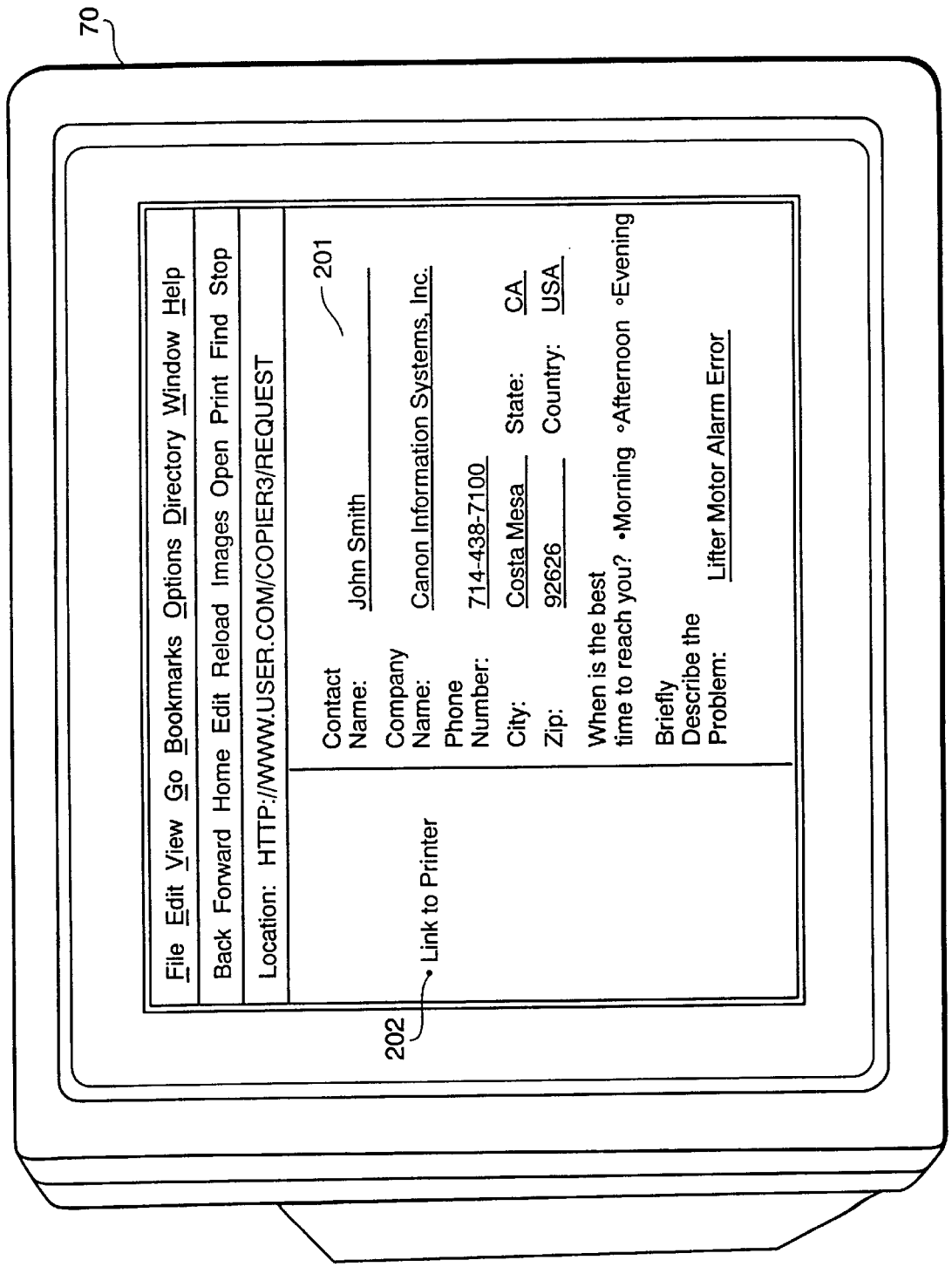
FIG. 19 depicts a service request page automatically generated by a network copier in response to a detected condition.

FIG. 19 depicts a service request page automatically generated by a network copier in response to a detected condition. The page includes information 201 concerning the nature of the problem and user information. In addition, the page includes a link 202 to other pages containing additional information that can be retrieved from the network copier.

Figure 20:
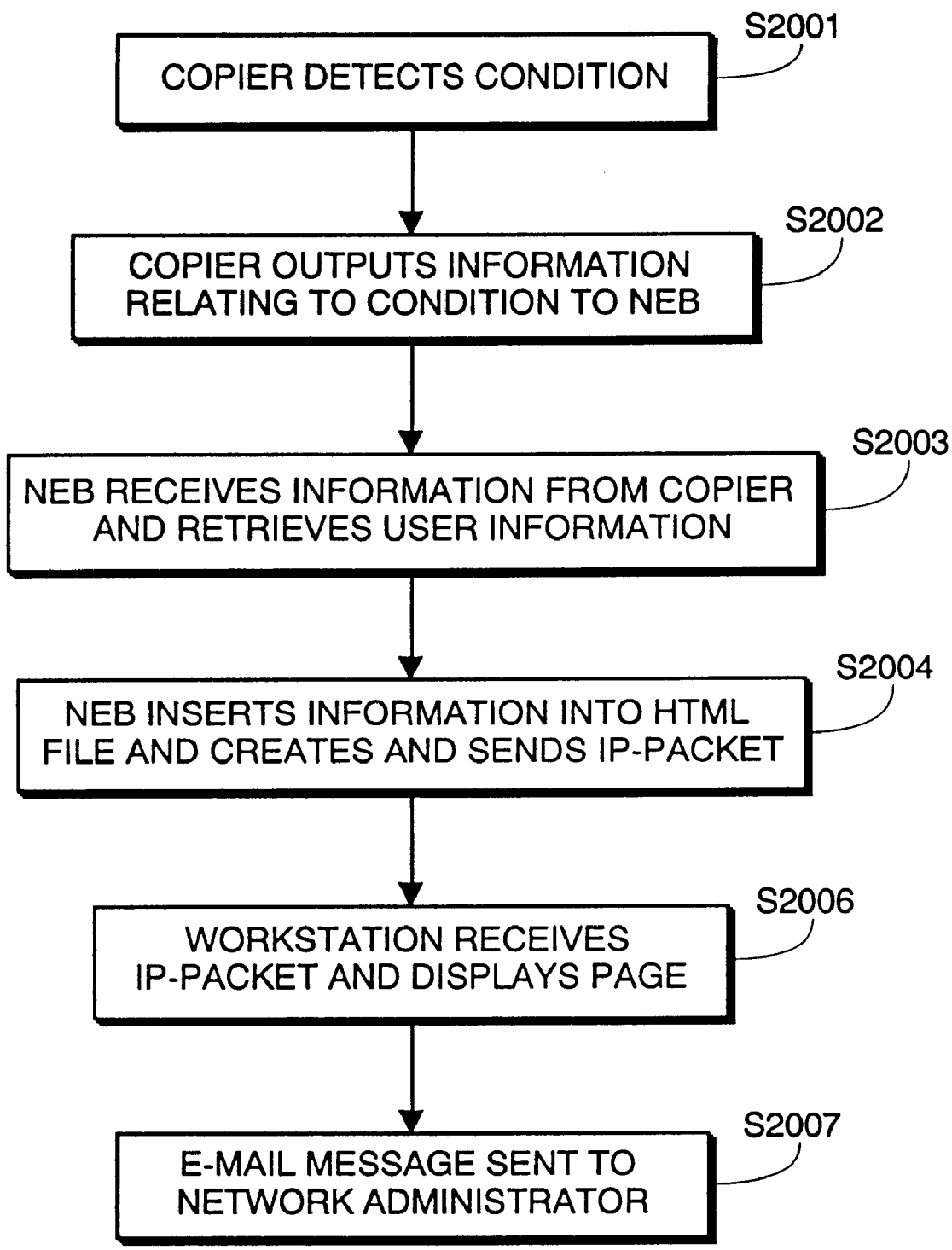
FIG. 20 is a flowchart for describing a method by which a network peripheral device may send an automatic service request over an IP-network.

FIG. 20 is a flowchart illustrating a method by which network copier 11 sends an automatic service request to a service organization operating workstation 1.

Generally, according to FIG. 20, a condition of the network peripheral device is detected. Then, in response to the detected condition, status information is automatically obtained, the status information corresponding to the detected condition. Finally, upon obtaining the status information, an IP-packet is automatically transmitted to the remote service organization via the IP-network, the IP-packet containing the status information.

More particularly, in step S2001, network copier 11 detects a condition for which service is required. In this context, service might include, for example, technical service and maintenance or service from a sales organization, such as delivery of new part. The condition might consist of an operational problem, such as a motor failure, discovered during self-diagnostic testing or during normal operations. Alternatively, the condition might consist of an event triggered by exceeding a threshold quantity of usage, such as exceeding a threshold number of pages printed without performing scheduled maintenance. Finally, the condition might be triggered by a particular user input, such as pressing a button instructing copier 11 to place a purchase order request.

In step S2002, in response to the detected condition information specifically relating to the detected condition together with copier configuration and/or status information is output from copier 11 to NEB 14 via XP interface 51. Although in this embodiment the information relating to the detected condition is generated solely within copier 11, it will of course be understood other techniques might instead be employed in which NEB 14 plays an active role in querying copier 11 for such information.

In step S2003, NIB 14 receives the information from copier 11 and retrieves from EPROM 34 information regarding the user and a contact person for the user.

In step S2004, NIB 14 inserts the obtained information into an HTML file selected from HTTP files 65, which also includes a link back to copier 11. Then, NIB 14 creates and sends an IP-packet including the HTML file and with the destination field designating the service organization. The IP-packet is transmitted to workstation 1 successively via LAN 15, router 7, World Wide Web 6 and router 2, as described above in more detail.

In step S2006, the IP-packet is received by workstation 1. A browser executing on workstation 1 displays the page according to the received instructions. FIG. 19 illustrates the received Web page. As shown, the page includes relevant information 201 concerning the user and the detected condition. In addition, by clicking on link 202 using mouse 76, the servicer organization can automatically obtain additional pages from the network copier.

In step S2007, NIB 14 prepares and sends an e-mail message to workstation 9 in order to advise the network administrator that a service request has been submitted.

Although the process steps described above transmit an HTML file, various data formats can be used to transmit the relevant data from the network peripheral to the service organization via the IP-network. Examples include transmitting only the field data in CGI format and transmitting the information by e-mail.

The present invention has been described with respect to particular illustrative embodiments. However, it is to be understood that the invention is not limited to the above described embodiments and that various changes and modifications may be made by those of ordinary skill in the art without departing from the spirit and scope of the invention.

What is claimed is:

1. A method for communicating status information to a remote service organization from a network peripheral device connected to a network router, said method comprising:

detecting a condition of the network peripheral device for which service is required;

automatically obtaining status information in response to the detected condition, wherein obtaining the status information is conditioned on detection of the condition for which service is required and wherein the status information corresponds to the detected condition; and automatically transmitting, upon obtaining the status information, a network packet to the remote service organization via the network, the network packet containing the status information.

2. A method according to claim 1, wherein the detected condition includes an operational problem.

3. A method according to claim 1, wherein the detected condition is related to a quantity of usage of the network peripheral device.

4. A method according to claim 1, wherein the remote service organization comprises a technical support facility.

5. A method according to claim 1, wherein the remote service organization comprises a sales facility.

6. A method according to claim 1, wherein the network peripheral device comprises a copier.

7. A method according to claim 1, wherein the packet includes an HTML file.

8. A method according to claim 7, wherein the HTML file includes a hypertext link to retrieve a second page from the peripheral device.

9. A method according to claim 1, wherein the network peripheral device is connected to a LAN, said method further comprising a step of automatically sending a message from the network peripheral device to a workstation connected to the LAN to indicate that the packet has been sent to the remote service organization.

10. A method according to claim 1, wherein the detected condition is set in accordance with a user input.

11. A method according to claim 1, wherein the network peripheral obtains the status information, and wherein the network peripheral transmits the network packet.

12. Computer-executable process steps stored in a computer-readable medium, the process steps to communicate status information to a remote service organization from a network peripheral device connected to a network router, said process steps comprising:

a detecting step to detect a condition of the network peripheral device for which service is required;

an obtaining step to obtain status information automatically in response to the detected condition, wherein obtaining the status information is conditioned on detection of the condition for which service is required and wherein the status information corresponds to the detected condition; and a transmitting step to transmit automatically, upon obtaining the status information, a network packet to the remote service organization via the network, the network packet containing the status information.

13. Computer-executable process steps according to claim 12, wherein the detected condition includes an operational problem.

14. Computer-executable process steps according to claim 12, wherein the detected condition is related to a quantity of usage of the network peripheral device.

15. Computer-executable process steps according to claim 12, wherein the remote service organization comprises a technical support facility.

16. Computer-executable process steps according to claim 12, wherein the remote service organization comprises a sales facility.

17. Computer-executable process steps according to claim 12, wherein the network peripheral device comprises a copier.

18. Computer-executable process steps according to claim 12, wherein the packet includes an HTML file.

19. Computer-executable process steps according to claim 18, wherein the HTML file includes a hypertext link to retrieve a second page from the peripheral device.

20. Computer-executable process steps according to claim 12, wherein said computer-executable process steps further comprise a sending step to send a message from the network peripheral device automatically to a workstation via a LAN connection to indicate that the packet has been sent to the remote service organization.

21. Computer-executable process steps according to claim 1, wherein the detected condition is set in accordance with a user input.

22. Computer-executable process steps according to claim 12, wherein the network peripheral obtains the status information, and wherein the network peripheral transmits the network packet.

23. A peripheral device which automatically initiates communication of status information to a remote service organization via a network, said peripheral device comprising:

a memory which stores process steps for execution by a processor; and a processor which executes the process steps stored in the memory (1) to detect a condition of the peripheral device for which service is required, (2) to obtain status information automatically in response to the detected condition, wherein obtaining the status information is conditioned on detection of the condition for which service is required and wherein the status information corresponds to the detected condition, and (3) to initiate transmission of a network packet to the remote service organization via the network automatically upon obtaining the status information, the network packet containing the status information.

24. A peripheral device according to claim 23, wherein the detected condition includes an operational problem.

25. A peripheral device according to claim 23, wherein the detected condition is related to a quantity of usage of the peripheral device.

26. A peripheral device according to claim 23, wherein the remote service organization comprises a technical support facility.

27. A peripheral device according to claim 23, wherein the remote service organization comprises a sales facility.

28. A peripheral device according to claim 23, wherein the peripheral device comprises a copier.

29. A peripheral device according to claim 23, wherein the packet includes an HTML file.

30. A peripheral device according to claim 29, wherein the HTML file includes a hypertext link to retrieve a second page from the peripheral device.

31. A peripheral device according to claim 23, wherein said processor executes process steps stored in the memory to initiate sending a message from the peripheral device to a workstation connected to the LAN, the processor initiating the sending of the message automatically, and the message indicating that the packet has been sent to the remote service organization.

32. A network peripheral device according to claim 1, wherein the detected condition is set in accordance with a user input.

33. A peripheral device according to claim 23, wherein the peripheral obtains the status information, and wherein the network peripheral transmits the network packet.

34. A method for communicating status information to a remote service organization from a network peripheral device connected to a network router, said method comprising:

automatically obtaining status information for the network peripheral device, wherein the network peripheral device obtains the status information; and automatically transmitting, upon obtaining the status information, a network packet to the remote service organization via the network, the network packet containing the status information, wherein the network peripheral device transmits the network packet.

35. A method according to claim 34, further comprising the step of detecting a condition of the network peripheral device, wherein obtaining the status information is conditioned on detection of a condition for which service is required and wherein the status information corresponds to the detected condition.

36. Computer executable process steps stored in a computer-readable medium, the process steps to communicate status information to a remote service organization from a network peripheral device connected to a network router, said process steps comprising:

an obtaining step to obtain status information for the network peripheral device, wherein the network peripheral device obtains the status information; and a transmitting step to transmit automatically, upon obtaining the status information, a network packet to the remote service organization via the network, the network packet containing the status information, wherein the network peripheral device transmits the network packet.

37. Computer-executable process steps according to claim 36, said process steps further comprising a detecting step to detect a condition of the network peripheral device, wherein obtaining the status information is conditioned on detection of a condition for which service is required and wherein the status information corresponds to the detected condition.

38. A peripheral device which automatically initiates communication of status information to a remote service organization via a network, said peripheral device comprising:

a memory which stores process steps for execution by a processor; and a processor which executes the process steps stored in the memory (1) to obtain status information automatically for the peripheral device, and (2) to initiate transmission of a network packet to the remote service organization via the network automatically upon obtaining the status information, the network packet containing the status information.

39. A peripheral device according to claim 38, wherein the processor further executes the process steps stored in the memory to detect a condition of the peripheral device, wherein obtaining the status information is conditioned on detection of a condition for which service is required and wherein the status information corresponds to the detected condition.

* * * * *